US011516044B2

(12) United States Patent
Sano

(10) Patent No.: US 11,516,044 B2
(45) Date of Patent: Nov. 29, 2022

(54) NETWORK PROCESSING DEVICE AND NETWORKS PROCESSING METHOD OF COMMUNICATION FRAMES

(71) Applicant: RENESAS ELECTRONICS CORPORATION, Tokyo (JP)

(72) Inventor: Keiichiro Sano, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 17/062,055

(22) Filed: Oct. 2, 2020

(65) Prior Publication Data
US 2021/0111922 A1 Apr. 15, 2021

(30) Foreign Application Priority Data
Oct. 15, 2019 (JP) .............................. JP2019-188539

(51) Int. Cl.
*H04L 12/40* (2006.01)
*H04L 45/7453* (2022.01)
*G06F 13/16* (2006.01)
*H04L 69/22* (2022.01)
*H04L 101/622* (2022.01)

(52) U.S. Cl.
CPC .... *H04L 12/40071* (2013.01); *G06F 13/1631* (2013.01); *H04L 45/7453* (2013.01); *H04L 69/22* (2013.01); *H04L 2101/622* (2022.05)

(58) Field of Classification Search
CPC ........... H04L 12/40071; H04L 45/7453; H04L 45/745; H04L 45/66; H04L 61/6022; H04L 69/22; G06F 13/1631
See application file for complete search history.

(56) References Cited

U.S. PATENT DOCUMENTS

| 9,819,587 | B1* | 11/2017 | Tracy ................. H04L 45/7453 |
| 10,063,458 | B2* | 8/2018 | Zhang ..................... H04L 45/04 |
| 10,230,639 | B1* | 3/2019 | Patil ..................... G06F 16/2246 |
| 10,637,778 | B1* | 4/2020 | Warfield ............... H04L 45/745 |
| 10,708,272 | B1* | 7/2020 | Holbrook .............. H04L 9/3242 |
| 2014/0006706 | A1 | 1/2014 | Wang |
| 2015/0295885 | A1* | 10/2015 | Congdon ............ H04L 45/7453 370/392 |
| 2018/0262896 | A1 | 9/2018 | Manabe |

FOREIGN PATENT DOCUMENTS

| JP | 2014-042091 A | 3/2014 |
| JP | 2018-148438 A | 9/2018 |

OTHER PUBLICATIONS

Extended European Search Report issued in corresponding European Patent Application No. 20200478.4-1213, dated Feb. 24, 2021.

* cited by examiner

*Primary Examiner* — Kent Krueger
(74) *Attorney, Agent, or Firm* — McDermott Will & Emery LLP

(57) ABSTRACT

To realize a low power consumption and a small area of a network communication system and a semiconductor device for mounting the same. In the processing method of the network router or network communication frame, the received frame is input to the hash generator, to obtain an address based on the resulting hash value, the position of the address in the rule table, stores the rule corresponding to the received frame.

15 Claims, 28 Drawing Sheets

FIG. 12

| ADDR | CDATA | | | | RULE | GRP |
|---|---|---|---|---|---|---|
| | EV | CB | CRPV | CRP | | |
| 0 | | | | | | |
| 1 | | | | | | |
| 2 | | | | | | |
| 3 | | | | | | |
| 4 | | | | | | |
| 5 | | | | | | |
| ... | | | | | | |

102b

NETWORK PROCESSING DEVICE AND NETWORKS PROCESSING METHOD OF COMMUNICATION FRAMES

CROSS-REFERENCE TO RELATED APPLICATIONS

The disclosure of Japanese Patent Application No. 2019-188539 filed on Oct. 15, 2019 including the specification, drawings and abstract is incorporated herein by reference in its entirety.

BACKGROUND

The present invention relates to a network processing apparatus and a method of processing a network communication frame, for example, a network processing apparatus mounted on a vehicle, a method of processing a network communication frame, and a semiconductor device constituting them.

For example, a vehicle such as an automobile, a number of sensors for monitoring the status of the vehicle and a human interface or the like for notifying the driver of the state of the vehicle is mounted. Such sensors and human interfaces are connected to Ethernet buses, for example, to form communication systems.

There is a disclosed technique listed below.
[Patent Document 1] Japanese Unexamined Patent Application Publication No. 2014-42091
[Patent Document 2] Japanese Unexamined Patent Application Publication No. 2018-148438

SUMMARY

For in-vehicle communication systems, Ethernet-TSN (Time-Sensitive Networking) standard which extended Ethernet standard is applied. Ethernet-TSN standard has been developed in IEEE standard since 2017, and has attracted attention as a core technique for advanced driving support systems (ADAS) and automated driving. Although Ethernet-TSN standard is not limited to an in-vehicle communication system and can be applied to various systems, in the present specification, Ethernet-TSN standard is exemplified as being applied to an in-vehicle communication system.

When a high security function is implemented in an in-vehicle communication system, a large-scale logic is required. In a microcontroller unit (MCU) in which logic is implemented, reduction of power consumption is required. Since the logic of high power consumption has a large calorific value, high power consumption cannot be tolerated for an on-board electronic system in which sufficient exhaust heat mechanism cannot be secured. Considering that the vehicle-mounted communication system is connected not only to the communication network in the vehicle (local area network) but also to a global network such as the Internet, there is a limit to the implementation of the conventional vehicle-mounted communication system in order to secure high safety and security.

Of the present disclosure, a summary of representative ones will be briefly described as follows. That is, according to the invention according to one embodiment, in the method of processing the network processing apparatus or the network communication frame, defines a rule for processing the received frame, the rule is input to the hash generator, the resulting hash value Obtain an address based on, the position of the address in the rule table, stores the rule.

According to an invention according to another embodiment, in the method of processing the network processing apparatus or the network communication frame, in accordance with the frame header of the received frame, to change the method of determining the storage address of the rule corresponding to the frame.

According to an invention according to another embodiment, in the method of processing a network processing apparatus or a network communication frame, the rule is input to the hash generator, in addition to the configuration for obtaining an address based on the resulting hash value, a configuration for detecting the presence or absence of a collision of the hash value, and a configuration for generating an address when a collision of the hash value occurs.

BRIEF DESCRIPTION OF THE DRAWINGS

FIG. 12 is a diagram showing a configuration example of a rule table in the network switch according to the third embodiment.

DETAILED DESCRIPTION

Figure 1:
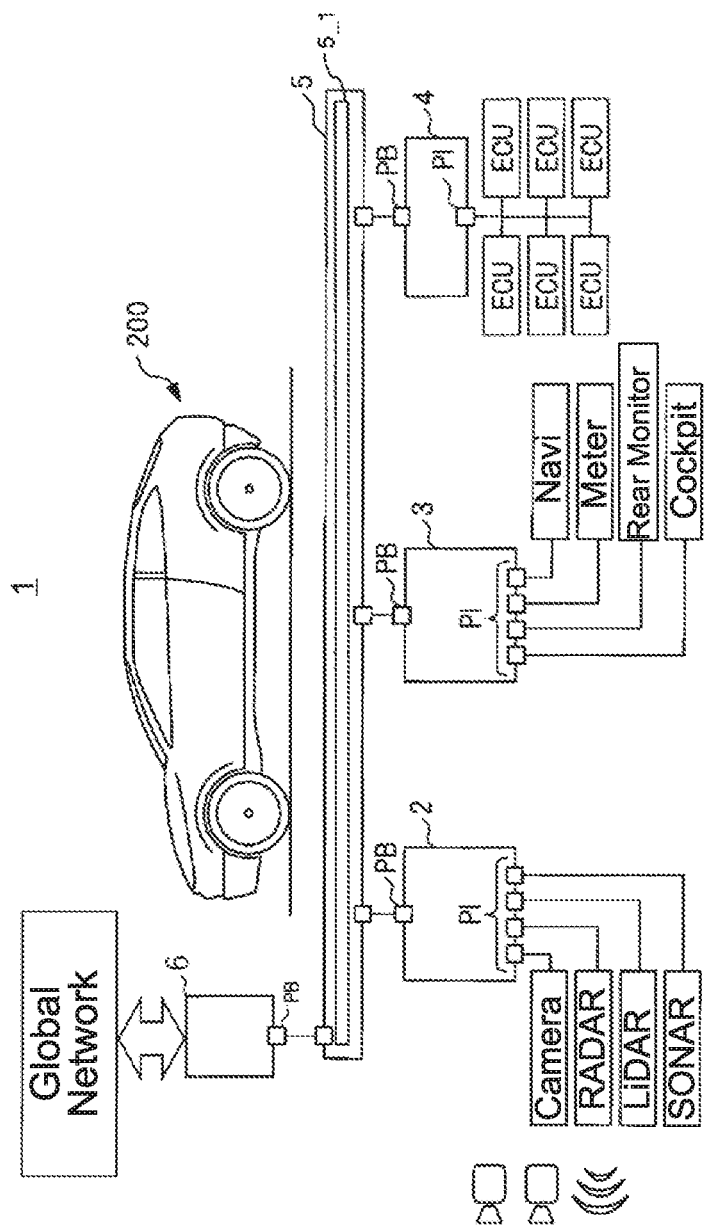
FIG. 1 is a diagram showing a configuration of an automobile in which a communication system according to a first embodiment is mounted.

Embodiments and examples will be described below with reference to the drawings. In the specification and the drawings, the same or corresponding components are denoted by the same reference numerals, and a repetitive description thereof may be omitted. In the drawings, for convenience of description, the configuration may be omitted or simplified. In addition, at least a part of the embodiment and each modification may be arbitrarily combined with each other.

FIG. 1 is a diagram showing a configuration of an automobile in which a communication system according to a first embodiment is mounted. 1, the automobile 200, the communication system 1 is mounted. The communication system 1 includes a device equipped with an automobile, a switch control circuit corresponding to the device, and an ethernet bus connected to the device through a switch control circuit. In the figure, various sensors, various human interfaces and ECUs (Engine control circuit) are shown as devices mounted on an automobile.

Examples of sensors include cameras, radars, Lidar and sonars. These sensors are connected to the gateway 5 via the switch control circuit 2. Examples of the human interface include a navigation device, a meter (instrument), a rear monitor, and a cockpit. These human interfaces are connected to the gateway 5 via the switch control circuit 3. Further, a plurality of ECUs are connected to the gateway 5 through the switch control circuit 4.

Switch control circuits 2, 3 and 4, a port PB connected to the gateway 5, and a port PI connected to the device, and a TSN control circuit, as shown in the figure, to connect the gateway 5 to the port PB, by connecting the device to the port PI, communication between the device and the gateway 5 via the switch control circuits 2, 3 and 4 It becomes possible. This allows communication between the devices through the gateway 5. The gateway 5 can also communicate with the outside of the automobile 200 by being connected to a global network configured outside the automobile 200 via the modem 6.

In FIG. 1, a single switch control circuit 2 monitors and controls a plurality of sensors connected to the port PI. However, a switch control circuit corresponding to each of the sensors provided in the communication system 1, by the respective switch control circuits, it may be monitored and controlled corresponding sensors. Similarly, the communication system 1 may be provided with a switch control circuit corresponding to each of the human interface and the ECU, and each of the human interface and the ECU may be monitored and controlled by the corresponding switch control circuit.

Here, the gateways 5 relay communications between the switch control circuits 2, 3, and 4 and the modems 6, thereby enabling the sensors and ECUs, which are terminal devices, to transmit and receive data using protocols based on Ethernet-TSN standard. Transmission and reception of this data, in Ethernet-TSN standard, the network communication frame comprising the communication data (hereinafter, frame) identifies the destination terminal device based on the frame header information given to, the routing to determine the transfer path It is realized by a function called. The gateway 5 includes a network router 5_1 as a network processing device (network processor) for routing. In this specification, the frame header information and other elements constituting the frame may also be referred to simply as a frame.

The network router 5_1 analyzes the frame transmitted from the source terminal device, and determines what processing to be performed on the subsequent frame. This function is called a filter. In particular, in a system connected to a global network, it is effective to use a network switch to protect the security level in internal and external networks.

(Inventor Consideration Example)

Figure 2:
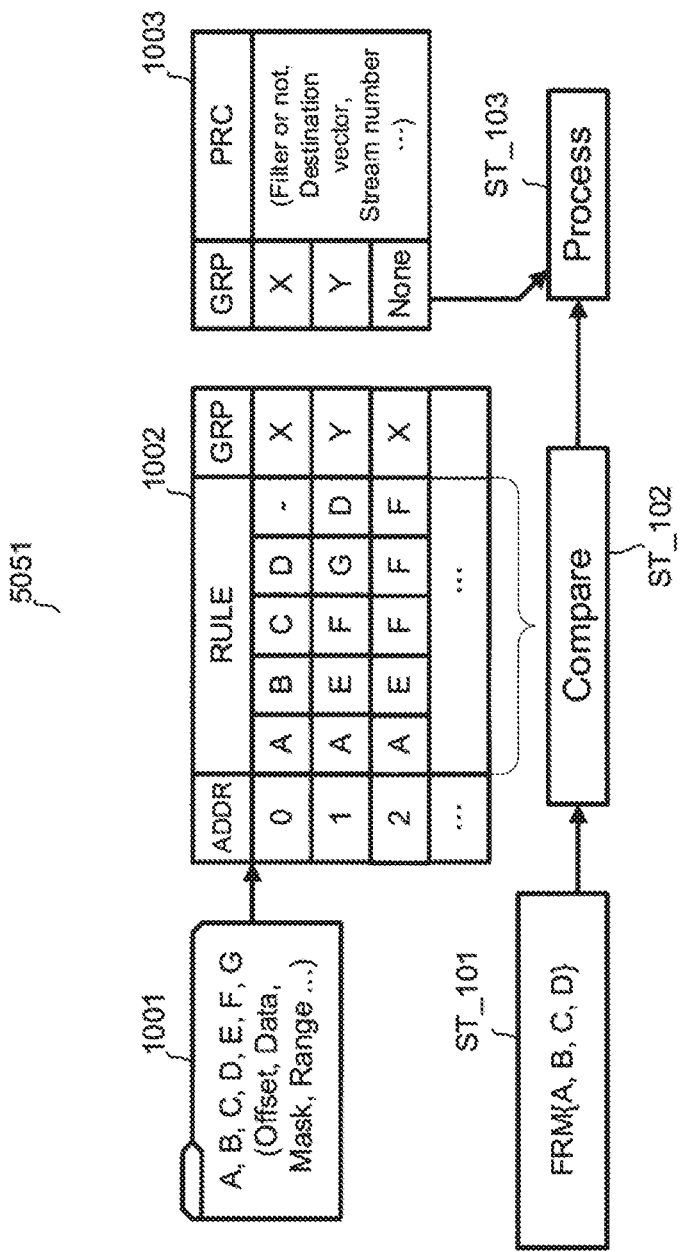
FIG. 2 is a diagram showing a processing flow of the network switch according to the examination example of the first embodiment.

Here, as an example examined by the inventor, the processing flow of the network switch 5051 used in the network router 5_1 shown in FIG. 2. It is assumed that a series of processing described below is implemented and controlled by a logic circuit included in the network switch 5051.

First, as an initial setting, a data table 1001 is created to define a frame that allows acceptance. The data table stores data elements such as the offset position of the predetermined data in the frame permitting acceptance, the value of the data, the mask bit for masking the data, the width of the value, and the like. Here, each data element is assumed to be A, B, C, D, E, F and G. That is, these A, B, C, D, E, F and G are intended to represent the type or configuration information of the data included in the frame, not the data itself included in the frame.

Next, a search condition, that is, a search rule (hereinafter, referred to as a rule) RULE is created by combining the data elements of the data table 1001. The rule has a combination pattern similar to that of a frame, and creates a plurality of rules corresponding to variations in the data structure of the frame that permits acceptance, registers one rule corresponding to one address ADDR, and configures the rule table 1002. Network switch 5051, the data configuration of the received frame by comparing whether it is defined in the rule table 1002 to determine a match or mismatch, or accept the received frame as a processing target, it is possible to determine whether to discard without accepting as a processing target. In addition, each rule is given group information GRP indicating which of the plurality of defined groups X and Y corresponds to the process to be applied.

Then, for the group GRP associated with the frame to permit acceptance, defines the processing PRC to be performed when receiving a frame belonging to a group GRP, to create a process table 1003 by arranging the correspondence relationship. The plurality of processes included in the process table 1003 is selected from a predetermined process such as deletion, setting of a transfer destination, grouping, and the like. Assuming the actual operation of the communication system 1, a typical process required as the network router 5_1 is a process of analyzing the contents of a frame and specifying a transfer destination in order to forward a frame from one terminal connected to the gateway 5 to another terminal.

Next, as a steady operation after the initial setting, receives the frame FRM in step ST_101. Here, assume that the reception frame FRM_0 is composed of the data elements of {A, B, C, D}. In the present specification, when the received frame FRM_0 is composed of data elements of {A, B, C, D}, the data elements are referred to as received frames {A, B, C, D}. As described above, A, B, C, and D represents the type of data included in the frame, i.e. the configuration information, not the data itself included in the frame.

Subsequently, in step ST_102, from the rule table 1002, it searches for a match with the data element of the received frame. Each rule is assigned group information indicating the reference destination of the process table 1003, the group GRP assigned in response to the received frame is selected. In this example, the group X is selected corresponding to the received frame FRM_0{A, B, C, D}.

Then, in step ST_103, refers to the process corresponding to the selected group X from the process table 1003, by the registered process is called, the process corresponding to the received frame FRM_0{A, B, C, D} is executed. Typical processes performed by the network switch 5051 include, for example, the transfer of a frame FRM from one terminal connected to the gateway 5 to another terminal.

In the course of examining the above examples, the inventors have found the following problems. That is, in the above example, when retrieving the reception frame FRM from the rule table 1002, until the reception frame FRM is found, it is necessary to confirm all the contents of the rule table (comparison). Although the rule table is implemented in registers and memories, a large amount of comparison circuits is required to perform comparison processing at high speed, which increases the circuit area and increases the power consumption. In addition, when the comparison circuit is reduced in order to reduce the circuit area and the comparison process is divided into multiple times, the retrieval time becomes longer.

When the rule table and the comparison process are configured by TCAM (Ternary Content ADDRessable Memory), this is a type in which a large number of comparison circuits are required, and similarly, there are problems of an increase in circuit area and power consumptions. As the power consumption increases, the heat generation of the circuit increases, which is fatal for in-vehicle electronic devices that are not sufficiently equipped with exhaust heat and cooling devices such as fans.

The network router 5_1 according to the first embodiment is configured based on the analysis of the above-described study example.

(Configuration of the Network Router According to the First Embodiment)

Figure 3:
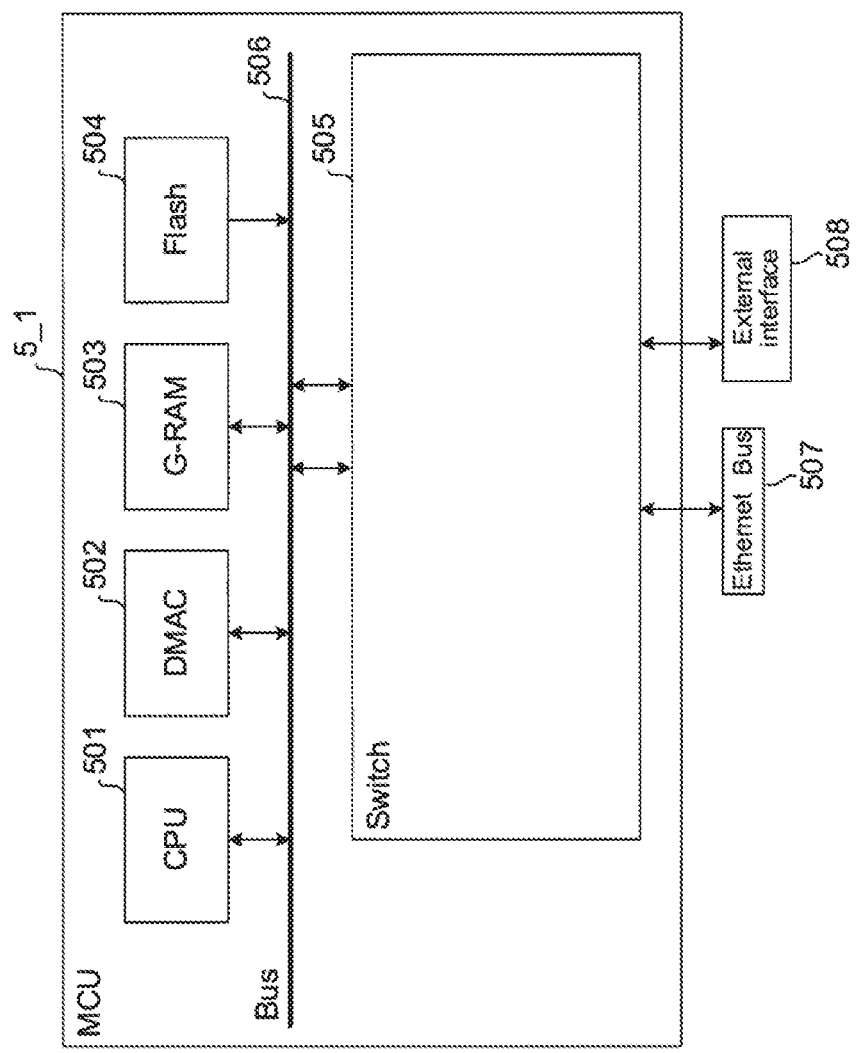
FIG. 3 is a diagram showing a configuration of a network router according to the first embodiment.

FIG. 3 shows an overview of the configuration of the network router 5_1 according to the first embodiment. The network router 5_1 is a network processor having a routing function, and is typically configured by a semiconductor integrated circuit (semiconductor device, semiconductor chip). Specifically, the semiconductor device, for example, a semiconductor substrate made of single crystal silicon, is constituted by a plurality of circuits formed using a known CMOS manufacturing process. Details thereof will be described below.

The network router 5_1 includes a CPU (central processing unit) 501, a DMAC (direct memory access control circuit) 502, a G-RAM (global random access memory) 503, a Flash memory 504, a network switch 505, and a bus 506 interconnecting them. CPU501 executes the program code stored in G-RAM503 or Flash memory 504, transmits and receives data to and from other components via the bus 506, and issues commands. DMAC502 manages and controls the sending and receiving of data between the components without CPU501. G-RAM503 and Flash memories 504 are data and program storage areas accessible from the above components via bus 506. G-RAM503 is comprised of volatile memory, such as a SRAM or DRAM, and Flash memory 504 is comprised of non-volatile memory. Network switch 505, the main part of the routing and filter functions according to the present embodiment is implemented. In addition, the network switch 505 includes an external bus 507 and an external interface 508 connected to the network router 5_1 and is capable of communicating with external devices of the network router 5_1.

The configuration of the network router 5_1 may be a form of a microcontrol circuit (MCU) or a microprocessor (MPU) adapted to the routing process.

Figure 4:
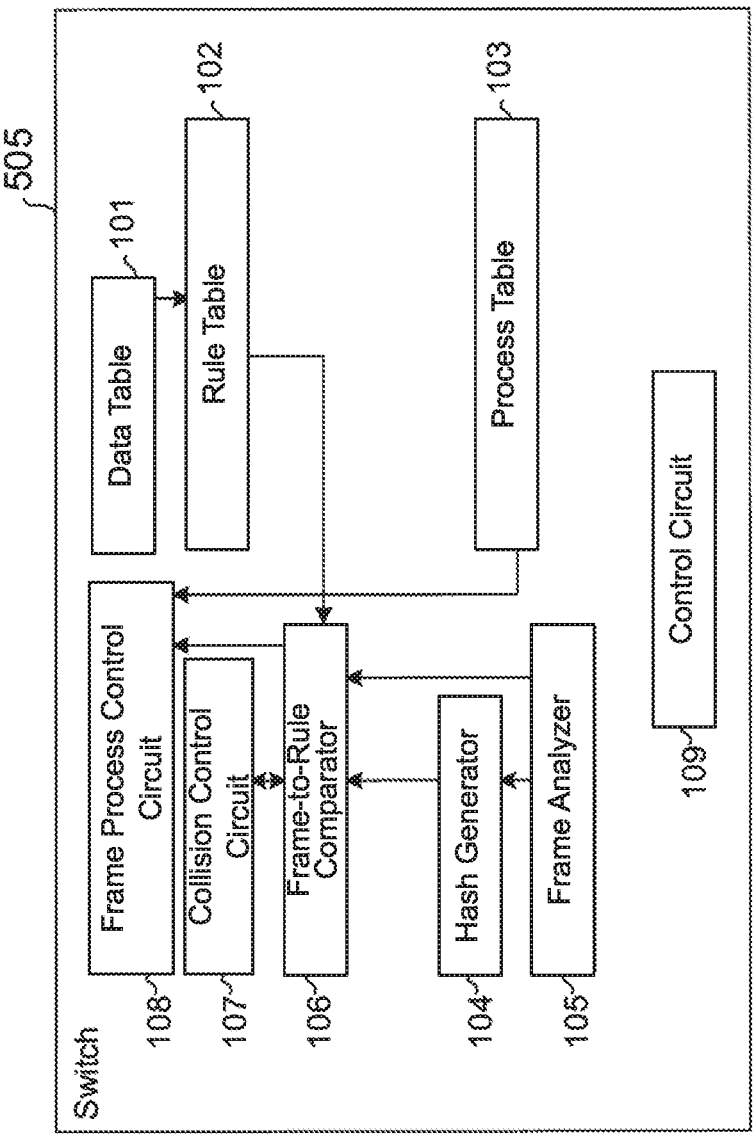
FIG. 4 is a diagram showing a configuration of a main part of the network switch according to the first embodiment.

FIG. 4 shows a configuration of a main part of the network switch 505 according to the first embodiment. The network switch 505 includes a data table 101, a rule table 102, a process table 103, a hash generator 104, a frame analyzer 105, a frame-to-rule comparator 106, a collision control circuit 107, a frame process control circuit 108, and a control circuit 109.

The data table 101, the rule table 102, and the process table 103 divide the data comprising the frame into fine elements, and arrange the rows and combinations of the patterns on the matrix. In the present embodiment, these tables are held in an internal memory 110 such as a DRAM memory (not shown). Unlike G-RAM503 and Flash memory 504, internal memory 110 allows direct access only from within network switch 505 and is not directly accessible from other components connected to bus 506.

The hash generator 104 generates hash value HASH by applying a particular algorithm/function to the received data. The hash value HASH is smaller data representing the accepted data and can be used as an index for retrieving the accepted data. Known techniques such as CRCs or SHAs can be used as algorithms or functions for generating hash value HASH. For example, it can be configured to receive data having a data width of 128 bits and output a hash value of 10 bits.

(Processing Flow of the Network Switch According to the First Embodiment: Definition Part)

From FIG. 5(*a*) to FIG. 5(*c*), among the flow of the processing method of the network communication frame in the network switch 505 according to the first embodiment, the rule RULE and processing corresponding to the received frame FRM It shows those belonging to the defining part defining. Note that a broken line arrow in the drawing means that a certain process or operation is applied to a target to which the arrow is connected. It is to be noted that the following series of processing flows are implemented and controlled by the control circuit 109 included in the network switch 505 unless otherwise specified.

Figure 5A:
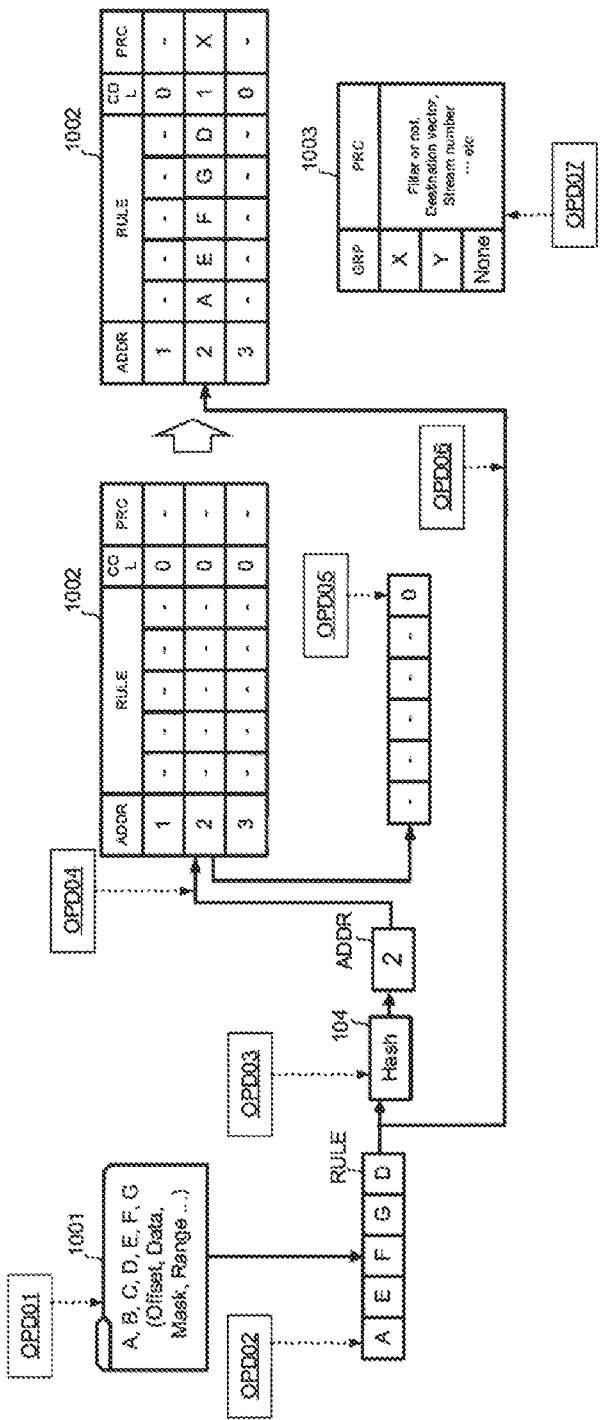
FIG. 5A is a diagram showing a first example of the definition part in the processing flow of the network switch according to the first embodiment.

Referring to FIG. 5A, first, in the process OPD01, the control circuit 109 creates a data table 101 to define rules of frames permitted to be accepted as initialization. The data table contains data elements such as position, value, mask bit, and width of the values for the frames to be accepted. Here, each data element is assumed to be A, B, C, D, E, F and G.

Next, in the process OPD02, the control circuit 109 combines the data elements of the data table 101 to create a rules RULE. This rule RULE has a combination pattern of data elements similar to a frame, and constructs a rule table 102 by creating a rule RULE corresponding to a variation of a frame that allows acceptance, and registering (storing) one rule corresponding to one address ADDR. Network switch 505, the combination of the data elements of the received frame compares whether it is defined in the rule table 102, by determining a match or mismatch, or accepts the received frame as a processing target, it is possible to determine whether to discard without accepting as a processing target. In addition, each rule has a process group information GRP that indicates which of the group X and Y is defined in a plurality of ways corresponding to the processing to be applied.

When the actual Ethernet frame is to be processed, the MAC address in Ethernet standard can be used as the rule RULE. Further, instead of the MAC address, it may be configured to include the frame information defining the destination of the frame in the communication system 1 in the rule RULE.

Here, there is one significant feature of how to determine the addressing ADDR in which a rule RULE is stored in this embodiment. That is, the address ADDR uses the hash value HASH obtained by entering a rule RULE into the hash generator 104. FIG. 5 illustrates an example in which, in the process OPD3, the rules RULE1{A, E, F, G, D} corresponding to the received frame FRM1 are inputted to the hash generator 104, and 2 is obtained as the hash HASH1.

In the subsequent process OPD4, the control circuit 109 reads the data at the position indicated by the address ADDR=2 in the rule table 102 based on the obtained hash value HASH1=2. Specifically, read the rule RULE and collision bit COL at the position indicated by address ADDR=2. Here, the collision bit COL is a two-state signal, i.e., a bit, that stores information indicating that a rule has already been stored in the address. If the collision bit COL is True (1, true), it indicates that the rule has already been stored at the address, and if the collision bit COL is False (0, false), it indicates that the rule has not been stored at the address. In a state in which no rule is registered in the rule table in the initialization state, the collision bits COL of all addresses are False (0).

In the subsequent processing OPD05, the control circuit 109 determines by the collision control circuit 107 that the value of the collision bit COL read in the processing OPD04 is False (0). That is, it is determined that the ruled RULE is not stored in the position indicated by address ADDR=2.

In the subsequent process OPD06, the control circuit 109 stores the rule RULE1{A, E, F, G, D} corresponding to the received frame FRM1 at the position indicated by the address ADDR=2 in the rule table 102. In other words, in the example of FIG. 5(a), the same value as the hash value HASH1 is used as the address ADDR in the rule table 102 in which the rule RULE1 is stored. In addition, the collision bit COL, which indicates that the rule has already been stored in the address, is set to 1True (1). On the other hand, the collision bit COL at the address where the rule is not stored is configured to be set to False (0).

FIG. 5A illustrates an example in which the process group "X" is specified as the process group information GRP defining the process corresponding to the rule RULE1.

Next, in the treatment OPD07, the control circuit 109 writes the processing to be executed corresponding to the process group "X" in the process table 103. In FIG. 5, the process table 103 is illustrated as a process executed corresponding to a certain process group, and defines a type of processing such as frame deletion, transfer destination setting, stream grouping, and the like. With these configurations, the network switch 505 can execute the process PRC defined in the process group "X" when receiving the reception frame FRM1{A, E, F, G, D}.

Figure 5B:
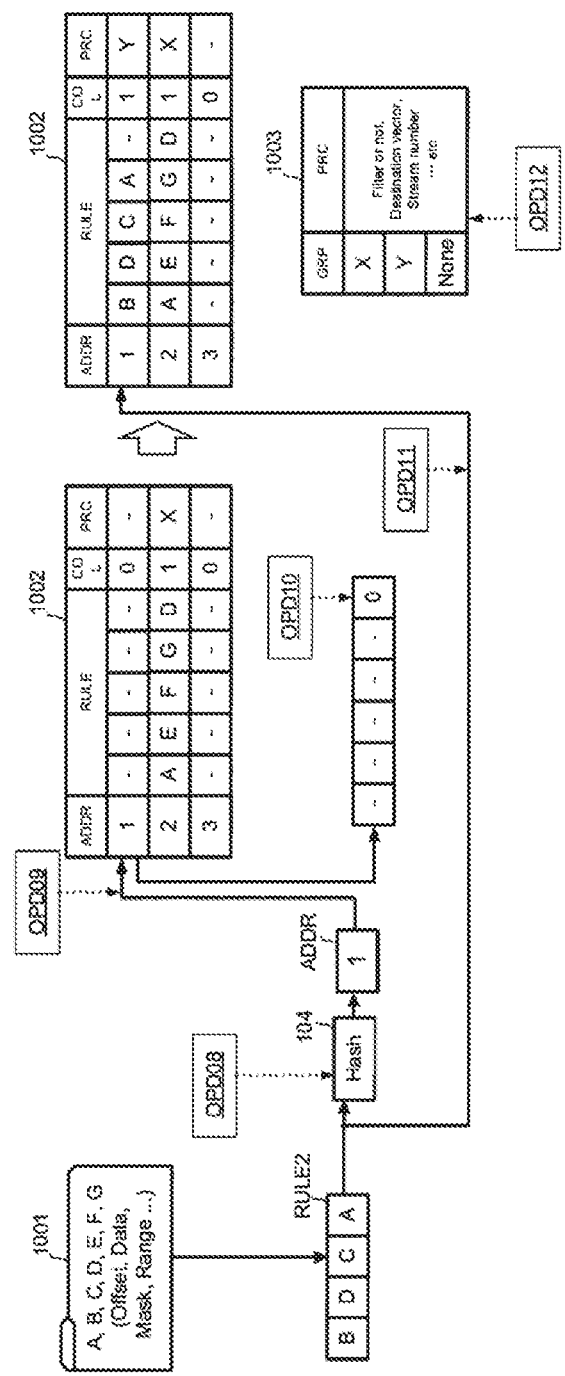
FIG. 5B is a diagram showing a second example of the definition part in the processing flow of the network switch according to the first embodiment.

Next, FIG. 5B is referred to. In the process OPD08, the control circuit 109 inputs the rules RULE2{B, D, C, A} corresponding to the received frame FRM2 to the hash generator 104, and obtains 1 as the hash HASH2.

Subsequently, in the process OPD09, similarly to the rule RULE1, based on the obtained hash value HASH2=1, the control circuit 109 reads the data at the position indicated by the address ADDR=1 in the rule table 102. Specifically, read the rule RULE and collision bit COL at the position indicated by address ADDR=1.

In the subsequent processing OPD10, the control circuit 109 determines that the value of the collision bit COL read in the processing OPD09 is False (0). That is, it is determined that the ruled RULE is not stored in the position indicated by address ADDR=2.

In the subsequent process OPD11, the control circuit 109 stores the rule RULE2{B, D, C, A} corresponding to the received frame FRM2 at the position of the address ADDR=1 in the rule table 102. Further, in the processing OPD12, the control circuit 109 designates the process group "Y" as the process group information GRP defining the processing corresponding to the rules RULE2, and writes the processing to be executed corresponding to the process group "Y" in the process table 103. Thus, the network switch 505, when receiving the reception frame FRM2{B, D, C, A}, it is possible to execute the process PRC defined by the process group "Y".

The control circuit 109 repeats the above-described processing, defines rules for all combinations of the frame FRMs for which inputs are received, stores the rules in the rule table 102 using the hash-value HASH corresponding to the defined rules, and stores the processing executed corresponding to the rules in the process table.

Figure 5C:
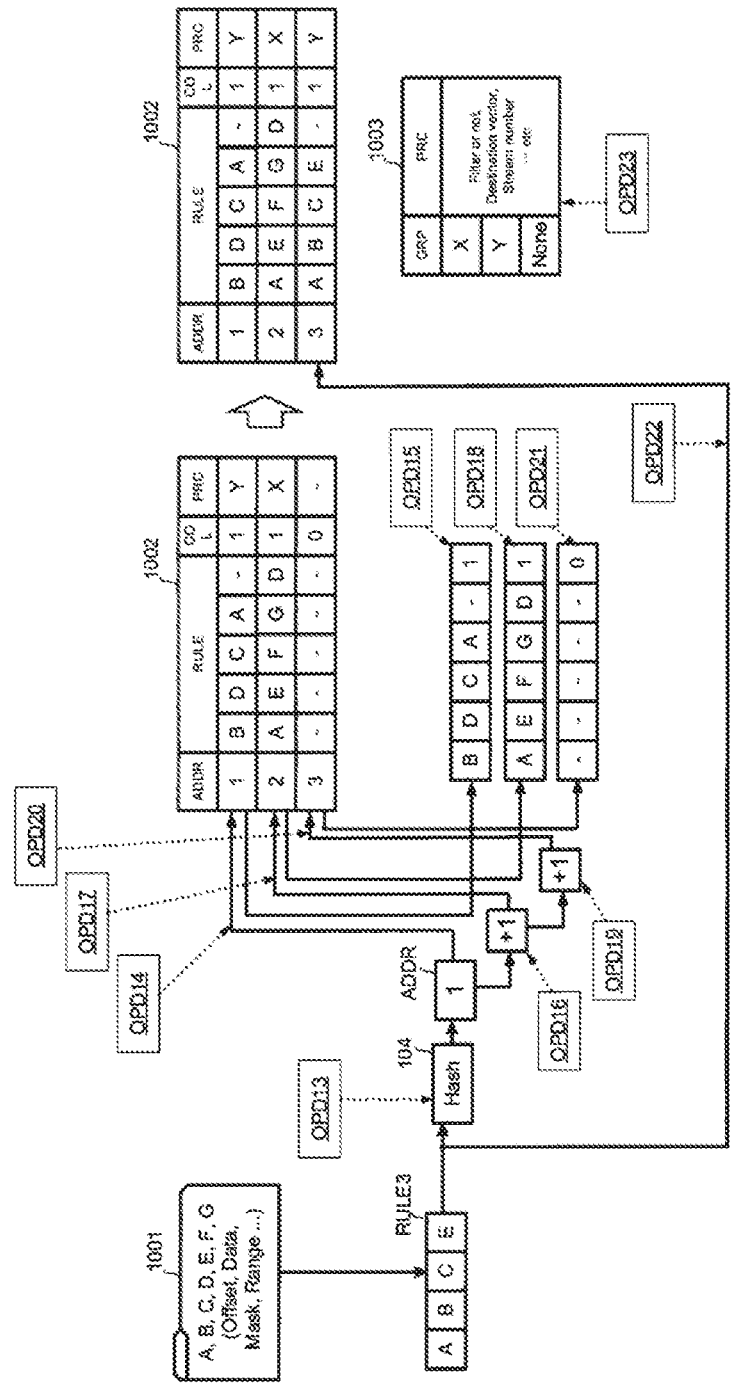
FIG. 5C is a diagram showing a third example of the definition part in the processing flow of the network switch according to the first embodiment.

Here, although the hash value HASH is uniquely determined for the rule RULE, an independent hash value HASH is not necessarily determined for all combinations of the rule RULE. In FIG. 5C, in the process OPD13, 1 is obtained as the hash-value HASH3 for the rules RULE3{A, B, C, E} corresponding to the received frame FRM3. The address ADDR in the rule table 102 corresponding to the hash value HASH3=1 is 1, but the rule RULE2 is already stored in the position of the address. Therefore, when writing the rule RULE3 corresponding to the reception frame FRM3 to the address ADDR=1 position, RULE2 that has been written is overwritten. Thus, the hash generator 104 outputs the same hash value for different input data is called a hash collision.

Collision control circuit 107 is configured to allow detection of this collision. Specifically, the collision control circuit 107 determines whether the collision bit COL at an address ADDR is True (1) or False (0). In the process OPD14, the control circuit 109 reads data at the position indicated by the address ADDR=1 in the rule table 102 based on the hash value HASH2=1. Specifically, read the rule RULE and collision bit COL at the position indicated by address ADDR=1.

Further, the collision control circuit 107 evaluates the value of the collision bit COL in the process OPD15, and if the collision bit COL is True (1), adds (increments) 1 to the address ADDR in the process OPD16. Then, in the process OPD17, the rule table 102 is read again. That is, the same processing as the processing OPD14 is performed as the address ADDR=2.

Here, the address ADDR=2, the rule RULE1 corresponding to the received frame FRM1 has been stored, the corresponding collision bit COL is a True (1). The collision control circuit 107, which detects that the collision bit COL is True (1) in the subsequent processing OPD18, adds (increments) 1 to the address ADDR again in the processing OPD19, and reads the rule table 102 in the processing OPD20. That is, the same processing as the processing OPD14 is performed as the address ADDR=3.

Since the rule is not stored in address ADDR=3, the corresponding collision bit COL is False (0). In the subsequent treatment OPD21, the collision control circuit 107 determines that the collision bit COL is False(0). In response to this, in the process OPD22, the control circuit 109 writes the rule RULE3 corresponding to the received frame FRM3 at the position of the address ADDR=3 in the rule table 102. In the process OPD23, the process group "Y" is specified as the process group information GRP that defines the process corresponding to the rule RULE3. When the network switch 505 receives the received frame FRM3{A, B, C, E}, the configuration and means for executing the process defined by the process group "Y" will be described later.

From the processing OPD01 to the processing OPD23, the rules RULE and processing corresponding to the received frame FRMs are defined parts. Next, the switching operation part that performs the process defined in the defining process according to the rules RULE will be described.

Figure 6A:
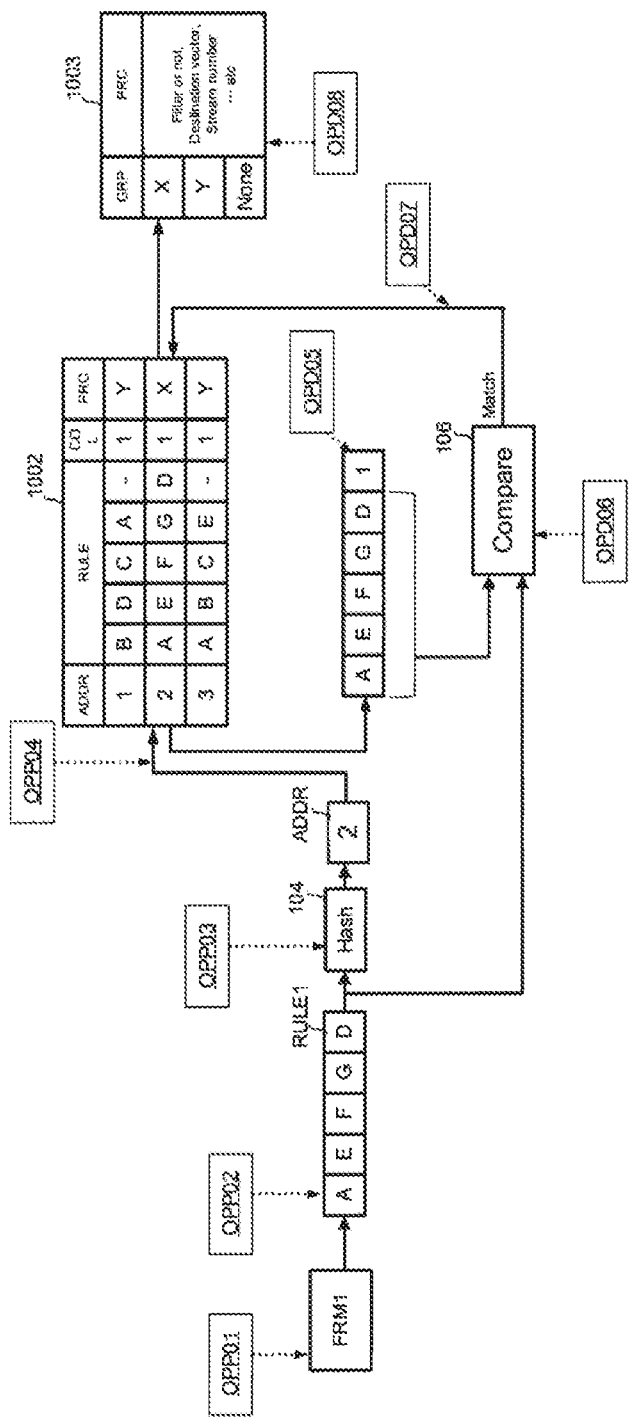
FIG. 6A is a diagram showing a first example of a switch operation part in the processing flow of the network switch according to the first embodiment.
Figure 6B:
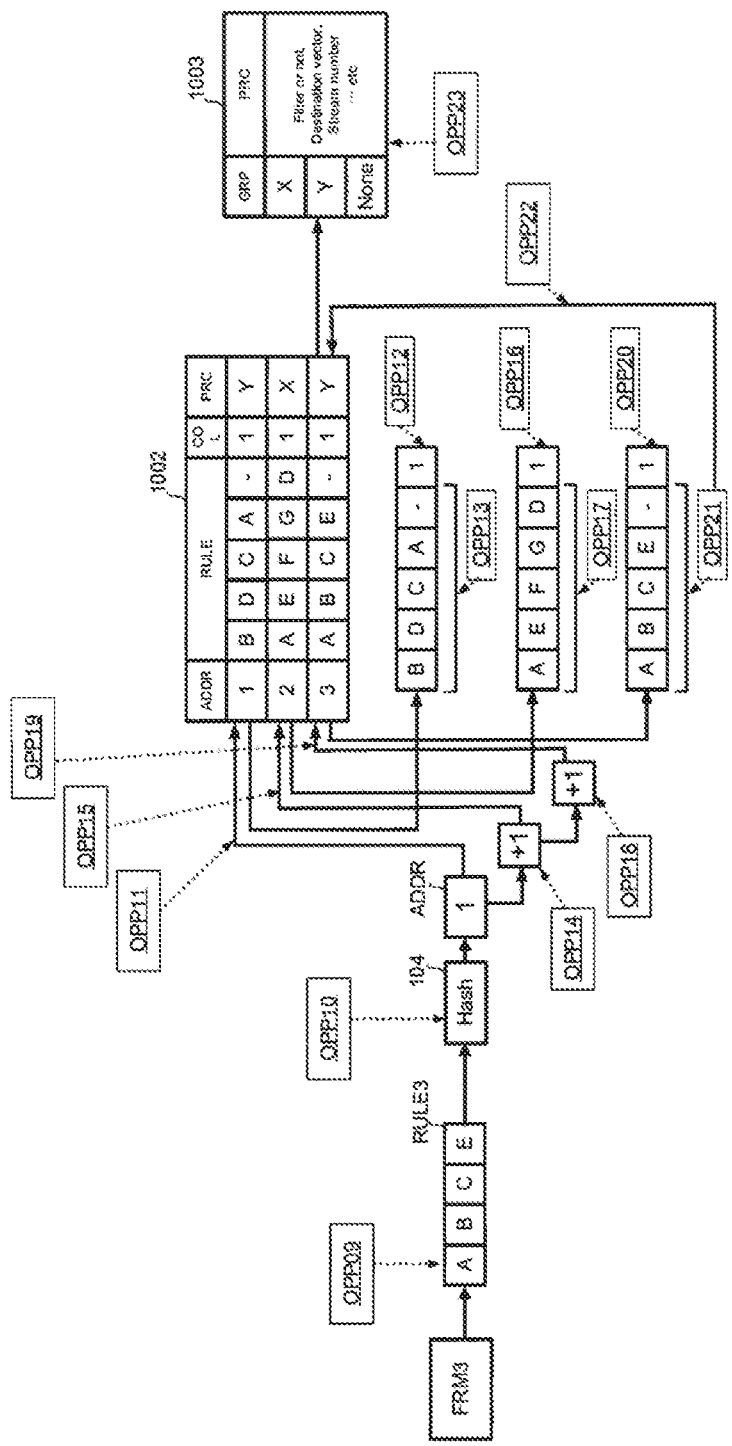
FIG. 6B is a diagram showing a second example of the processing flow of the network switch according to the first embodiment, which is related to the switch operation part.

FIGS. 6A to 6B show a flow of a processing method of a network communication frame in the network switch 505 according to the first embodiment, which belongs to a switch operation part for performing processing defined by a definition part according to a received frame FRM. It should be noted that the following series of processing flows are implemented and controlled by the control circuit 109 included in the network switch 505 unless otherwise specified.

Referring to FIG. 6(a), in the processing OPP01 of the switch operation part, the control circuit 109 receives the received frame FRM from the outside of the network switch 505, in the subsequent processing OPP02, the frame analyzer 105 analyses the data constituting the received frame FRM. In FIG. 5, in the processing OPP02, the instruction of the control circuit 109, the frame analyzer 105 analyses the received frame FRM, and outputs RULE1{A, E, F, G, D} is exemplified. In the subsequent process OPP03, the control circuit 109 inputs RULE1{A, E, F, G, D} to the hash generator 104 to obtain 2 as the hash HASH1.

In the subsequent process OPP04, the control circuit 109 reads the data at the position indicated by the address ADDR=2 in the rule table 102. Specifically, read the rule RULE and collision bit COL at the position indicated by address ADDR=2.

In the subsequent processing OPP05, the control circuit 109 determines by the collision control circuit 107 that the collision bit COL read in the processing OPP04 is True (1). That is, it is determined that the rule RULE is stored in the position indicated by the address ADDR=2.

In the subsequent treatment OPP06, the frame-to-rule comparator 106 determines that the rule RULE1 stored at the position of the address ADDR=2 in the rule table 102 matches the data structure of the received frame FRM1 according to an instruction from the control circuit 109.

In the subsequent processing OPP07, in response to a determination of a match at the processing OPP06, the control circuit 109 refers to the process group information GRP affixed to the rule RULE1 to obtain the process group "X".

In the subsequent processing OPP08, the control circuit 109 reads the processing PRC defined corresponding to the process group "X" from the process table 103, and instructs the frame process control circuit 108 to execute the predetermined processing PRC. The frame process control circuit 108 controls each component of the network router 5_1 including the network switch 505 in response to an instruction from the frame process control circuit 108, thereby achieving execution of predetermined processing PRC.

Next, referring to FIG. 6B, in the process OPP09, the control circuit 109 receives the next reception frame FRM from the outside of the network switch 505. In the subsequent processing OPP10, the instruction of the control circuit 109, the frame analyzer 105 analyses the next received frame FRM, and outputs a rule RULE3{A, B, C, E} corresponding to the received frame FRM3. The control circuit 109 inputs the rules RULE3{A, B, C, E} to the hash generator 104 to obtain 1 as the hash HASH3.

Subsequently, in the process OPP11, the control circuit 109 reads the data at the position indicated by the address ADDR=1 in the rule table 102. Specifically, read the rule RULE and collision bit COL at the position indicated by address ADDR=1.

In the subsequent processing OPP12, the control circuit 109 determines by the collision control circuit 107 that the collision bit COL read in the processing OPP10 is True (1). That is, it is determined that the rule RULE is stored in the position indicated by the address ADDR=1.

In the subsequent process OPP13, the frame-to-rule comparator 106 determines a mismatch between the rule RULE2 stored at the position of the address ADDR=1 in the rule table 102 and the data structure of the received frame FRM3 in accordance with an instruction from the control circuit 109.

In a subsequent process OPP14, in response to determining a mismatch in the process OPP13, the frame-to-rule comparator 106 adds 1 to the address ADDR. In other words, the addressing ADDR is incremented.

Subsequently, in the process OPP15, the control circuit 109 reads the data at the position indicated by the address ADDR=2 in the rule table 102. Specifically, read the rule RULE and collision bit COL at the position indicated by address ADDR=2.

In the subsequent processing OPP16, the control circuit 109 determines by the collision control circuit 107 that the collision bit COL read in the processing OPP15 is True (1). That is, it is determined that the rule RULE is stored in the position indicated by the address ADDR=2.

In the subsequent process OPP17, the frame-to-rule comparator 106 determines a mismatch between the rule RULE1 stored at the position of the address ADDR=2 in the rule table 102 and the data structure of the received frame FRM3 in accordance with an instruction from the control circuit 109.

In a subsequent processing OPP18, in response to determining a mismatch in the processing OPP17, the frame-to-rule comparator 106 adds an additional 1 to the address ADDR. In other words, the addressing ADDR is incremented further.

Subsequently, in the process OPP19, the control circuit 109 reads the data at the position indicated by the address ADDR=3 in the rule table 102. Specifically, read the rule RULE and collision bit COL at the position indicated by address ADDR=3.

In the subsequent processing OPP20, the control circuit 109 determines by the collision control circuit 107 that the collision bit COL read in the processing OPP19 is True (1). That is, it is determined that the rule RULE is stored in the position indicated by the address ADDR=3.

In the subsequent process OPP21, the frame-to-rule comparator 106 determines the coincidence between the rule RULE3 stored in the position of the address ADDR=3 in the rule table 102 and the data structure of the received frame FRM3 in accordance with an instruction from the control circuit 109.

In the subsequent processing OPP22, the control circuit 109 refers to the process group information GRP attached to the rules RULE3 in response to determination of coincidence in the processing OPP21, and obtains the process group information "Y".

In the subsequent processing OPP23, the control circuit 109 reads the processing PRC defined corresponding to the process group "Y" from the process table 103, and instructs the frame process control circuit 108 to execute the predetermined processing PRC. The frame process control circuit 108 controls each component of the network router 51 including the network switch 505 in response to an instruction from the frame process control circuit 108, thereby achieving execution of predetermined processing PRC.

Figure 7:
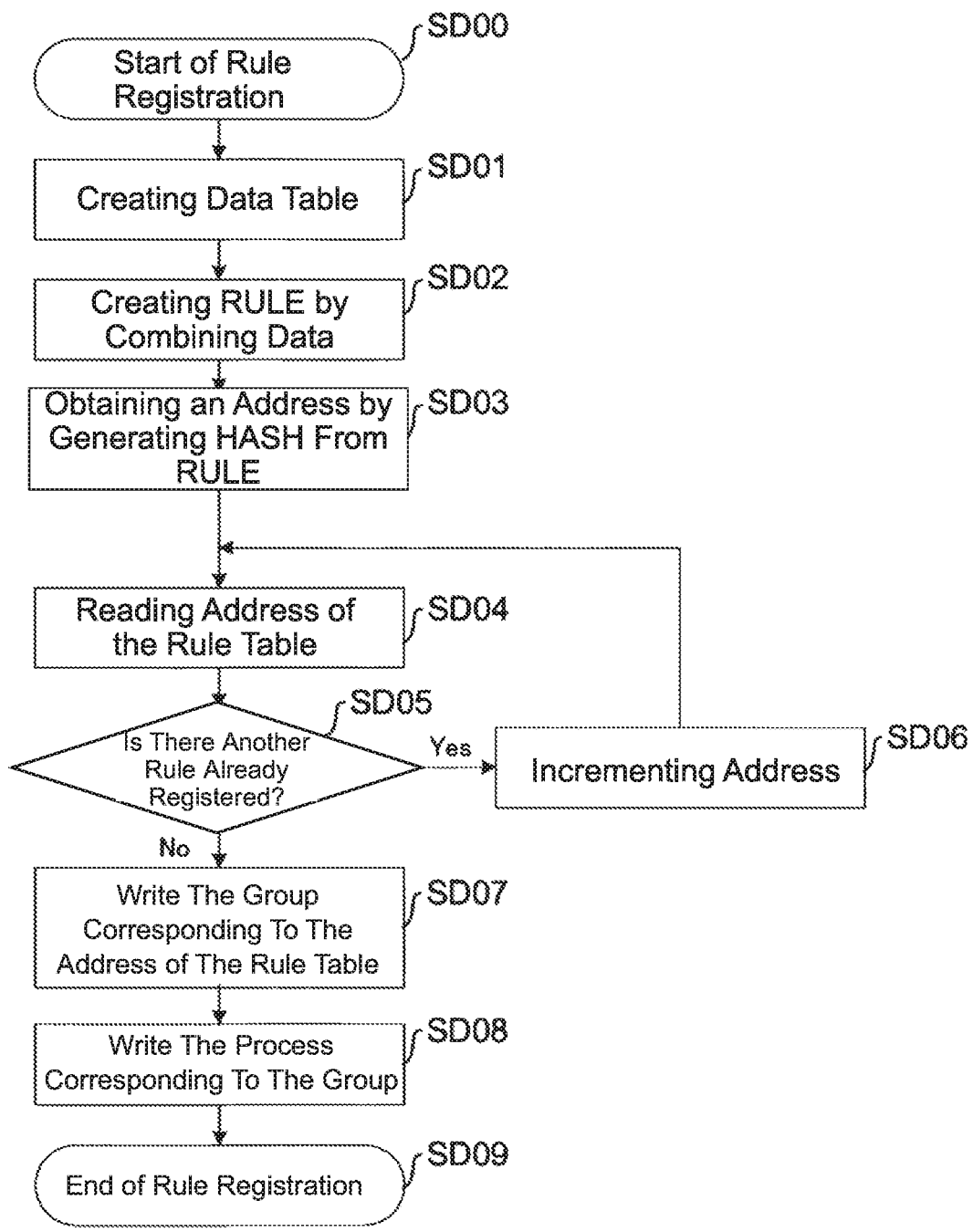
FIG. 7 is a flowchart relating to a definition part of the processing flow of the network switch according to the first embodiment.

FIG. 7 is a flowchart showing a method of processing a network communication frame in the network switch 505 according to the first embodiment described above, the method belonging to the definition part. The step SD00 is a step that indicates the beginning of the rule registration process. The step SD01 corresponds to the processing OPD01 in the step of creating a data table 101 to define a frame to allow acceptance. Step SD02 is a step of creating a rule RULE corresponding to the reception frame FRM by combining the data elements of the data table 101, corresponding to the processing OPD02. Step SD03 corresponds to the processing OPD03, the processing OPD08, and the processing OPD13 in the step of inputting the rule RULE to the hash generator 104 and obtaining the hash value HASH and making the address ADDR. Step SD04 is a step of reading the data of the position referred to by the address ADDR in the rule table 102, corresponding to the processing OPD04, processing OPD09, processing OPD14, processing OPD17, processing OPD20. The step SD05 corresponds to the processing SD04, the processing OPD05, OPD10 processing, OPD15 processing, OPD18 processing, and the processing SD05 in the step of determining whether or not there is already a registered rule in the data at the position referenced by the address ADDR by determining True (1) or False (0) of the collision bit COL included in the data acquired by reading the step SD04. The step SD06 is the step of adding (incrementing) 1 to the address ADDR, corresponding to the processing OPD16, the processing OPD19. The step SD07 corresponds to the processing OPD06, the processing OPD11, and the processing OPD22 in the step of writing the rule RULE and the corresponding process group information GRP at the position referenced by the address ADDR in the rule table 102. The step SD08 writes the processing executed in response to the process group information GRP to the process table, and corresponds to the processing OPD07, the processing OPD12, and the processing OPD23. The step SD09 is the step that completes the creation of the rule.

Figure 8:
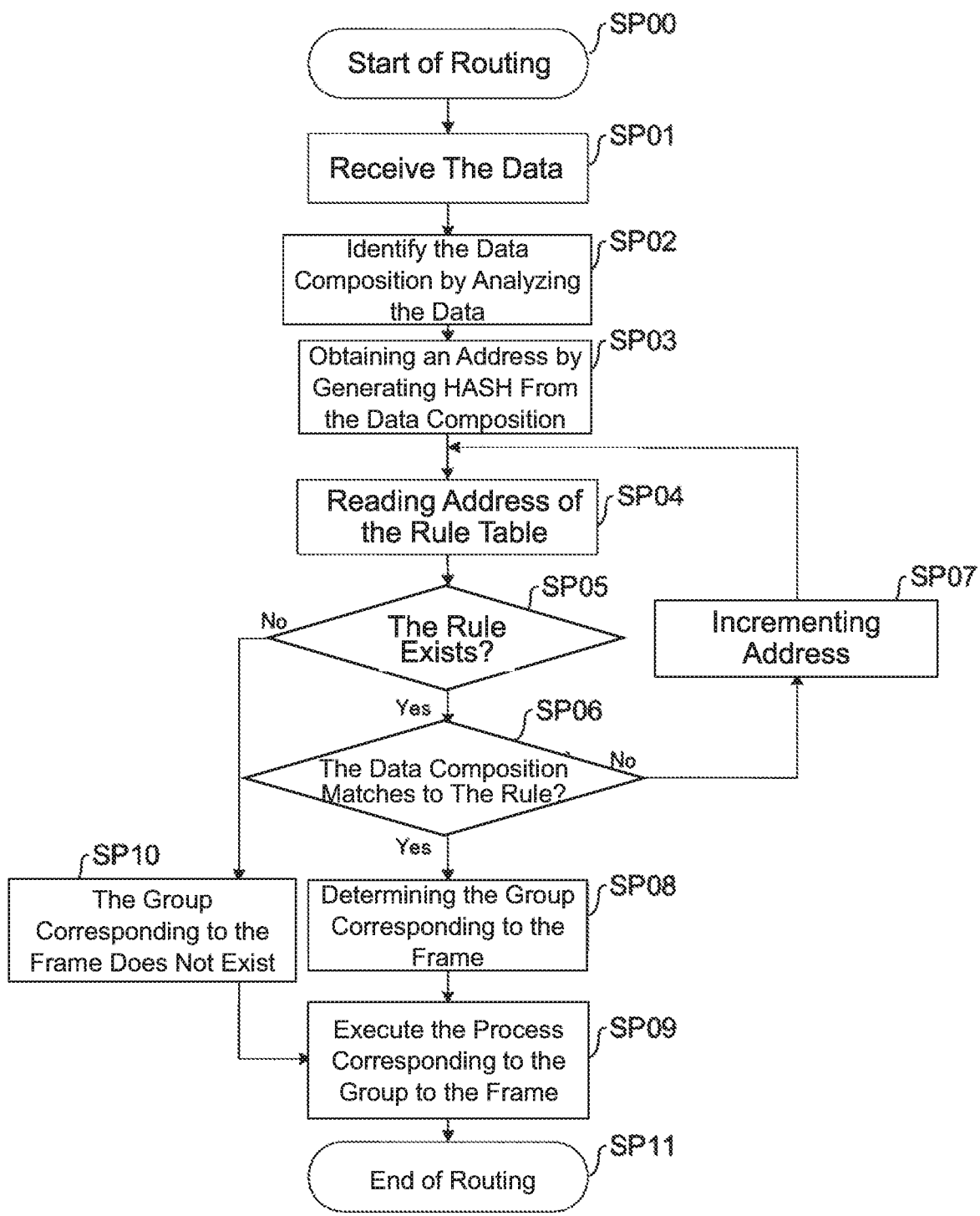
FIG. 8 is a flowchart relating to a switch operation part of the processing flow of the network switch according to the first embodiment.

FIG. 8 is a flowchart showing a method of processing a network communication frame in the network switch 505 according to the first embodiment described above, which belongs to a switch operation part. The step SP01 is the step that indicates the beginning of the routing. The step SP01 corresponds to the processing OPP01, OPP09 in the step in which the network switch 505 receives the received frame FRM from the outside. The step SP02 is a step of analyzing the received frame FRM to identify a combination of data, corresponding to the processing OPP02, the processing OPP10. The step SP03 corresponds to the processing OPP03 in the step of inputting the data configuration of the received frame FRM specified in the step SP02 to the hash generator 104, obtaining the hash value HASH and making the address ADDR. The step SP04 is the step of leading data at the point referred to in the address ADDR in the rule table 102, corresponding to processing OPP04, processing OPP11, processing OPP15, and processing OPP19. The step SP05 corresponds to the processing OPP05, processing OPP12, processing OPP16, and processing OPP20 in the step of determining whether or not already registered rules exist in the data of the position referred to by the address ADDR by determining True (1) or False (0) of the collision bit-COL included in the data acquired by the read of the step SP04. The step SP06 corresponds to the processing OPP06, processing OPP13, processing OPP17, and processing OPP21 in the step of comparing whether the already registered rule RULE in the step SP05 matches the data sequence of the received frame FRM. The step SP07 is the step of adding (incrementing) 1 to the address ADDR, corresponding to the processing OPP14, the processing OPP18. The step SP08 refers to the process group information GRP provided in the rule RULE that matches the data configuration of the received frame FRM, in the step of identifying the corresponding process group, corresponding to the process OPP07, the process OPP22. The step SP09 is a step that executes a process corresponding to the process group specified in the step SP08, and corresponds to the process OPP08 and the process OPP23. Step SP10 is a step of determining not to process the received frame FRMs in response to the determination that there are no registered rules in step SP05. The step SP11 is the step that completes routing.

Effect of the First Embodiment

A main effect of the network switch 505 according to the first embodiment is as follows. That is, the storage address of the rule RULE in the rule table 102 is determined according to the hash value HASH of the rule RULE. Thus, when a desired rule RULE is retrieved from the rule table 102, the hash HASH can be retrieved as an index instead of sequentially retrieving the rule table 102 from the beginning. According to the above-described configuration and method, since the processing for reading and comparing data in the rule table 102 can be reduced, the network switch 505 can be configured with a small area and low power consumption.

Further, another effect of the network switch 505 according to the first embodiment is as follows. That is, since the rule table 102 includes the collision bit COL and is configured to increment the address ADDR according to the value of the collision bit COL, even if the hash value corresponding to the rule RULE conflicts, the storage destination of the rule RULE in the rule table 102 can be allocated, and the allocated rule RULE can be appropriately retrieved.

In the operation of the network switch 505, the definition part and the switch operation part may be separately executed, or may be executed in parallel. As a result, the rule RULE can be newly registered in the rule table 102 during the switching operation.

(A Variant of Address Handling for Collision)

Also, the incrementing of address ADDR in step SD06 and step SP07 can be replaced by other methods. For example, a method of using a random number instead of 1 as an increment value, a method of applying an arithmetic operation with an arbitrary number, a method of allowing an arbitrary value to be specified by register setting or the like, a method of selecting from a plurality of values according to the calculated value of the hash or the occurrence state of the collision, and a method of combining them as appropriate may be mentioned as an example.

Embodiment 2

Figure 9:
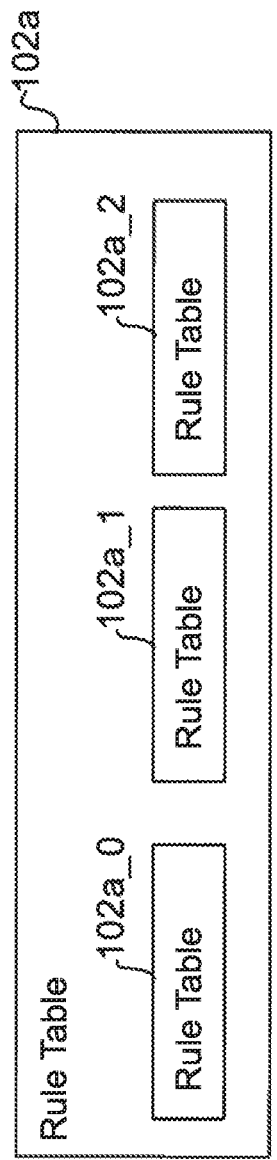
FIG. 9 is a diagram showing a configuration example of a rule table in the network switch according to the second embodiment.

Subsequently, the second embodiment will be described. In the second embodiment, a network switch 505a as another form of the network switch 505 according to the first embodiment will be described. FIG. 9 is a diagram showing a configuration example of the rule table 102a included in the network switch 505a according to the second embodiment. The network switch 505a may be the same as the first embodiment except for the rule tables 102a_0, 102a_1, and 102a_2 and the processing method of the internal data thereof. The internal configuration, processing, and operation steps of the network switch 505a are denoted by the same reference numerals as those in the first embodiment, and the description of the first embodiment is applied mutatis mutandis.

(Method for Constructing a Rule Table According to the Second Embodiment)

Received frames often have a data width such as more than 200 bits. In response, rule table 102 also requires a data width of more than 200 bits per rule, and may require that tens of thousands, perhaps billions, or more, of rules be stored. The second embodiment expands the configuration of the rule table 102 in the network switch 505 according to the first embodiment and the processing method of its internal data, and discloses a configuration and method for efficiently implementing the functions of the rule table 102 with less hardware assets.

The reception frame FRMa according to the second embodiment includes frame header HD as information associated with the frame. Frame header HD is information that roughly classifies the data structure of a frame. For example, among network protocols such as IPv4, ICMPv4, IGMPv3, a protocol conforming to a frame FRM can be specified by the value of the frame header HD.

Here, the network switch 505a has three rule tables 102a_0, 102a_1, and 102a_2 in the rule table 102a, and the rule table to be referred to first differs according to the frame header HD of the frame FRM. Specifically, it is configured to first refer to the rule table 102a_0 for the frame with the frame header HD=0, the rule table 102a_1 for the frame with the frame header HD=1, and the rule table 102a_2 for the frame with the frame header HD=2. With this configuration, it is possible to prioritize the rules to be searched and the process to be processed, and to search the rules and execute the process in order of priority according to the frame header HD. Details will be described later.

(Processing Flow of Embodiment 2: Defined Part)

Figure 10A:
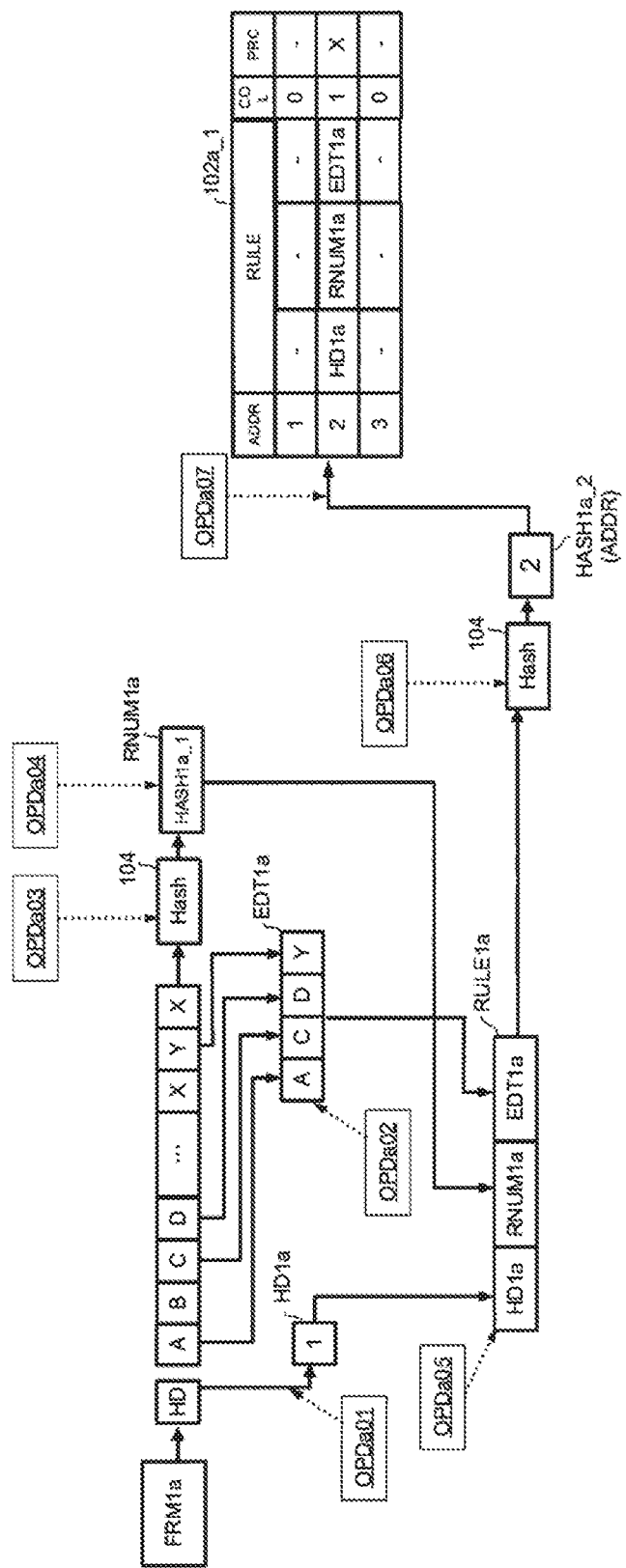
FIG. 10A is a diagram showing a first example of the definition part in the processing flow of the network switch according to the second embodiment.
Figure 10B:
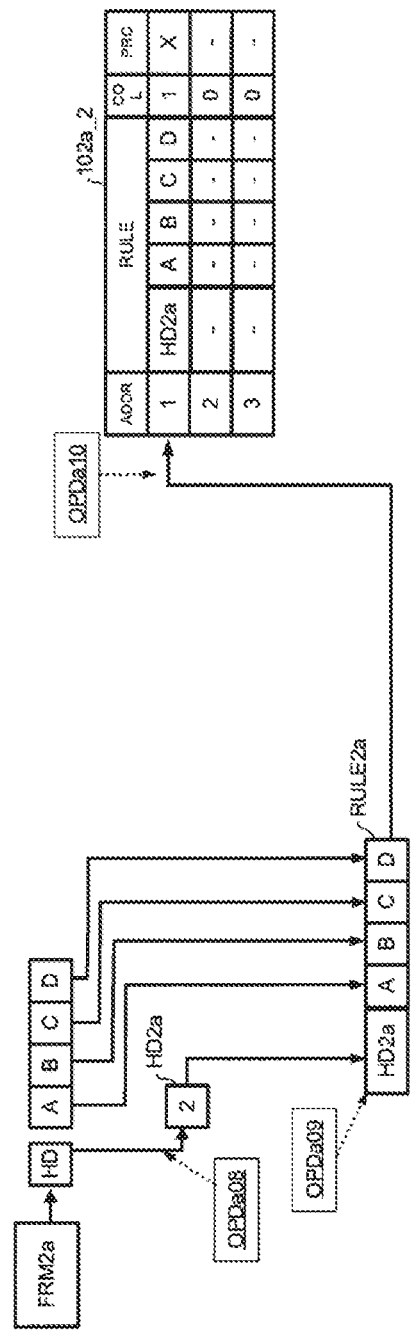
FIG. 10B is a diagram showing a second example of the definition part in the processing flow of the network switch according to the second embodiment.
Figure 10C:
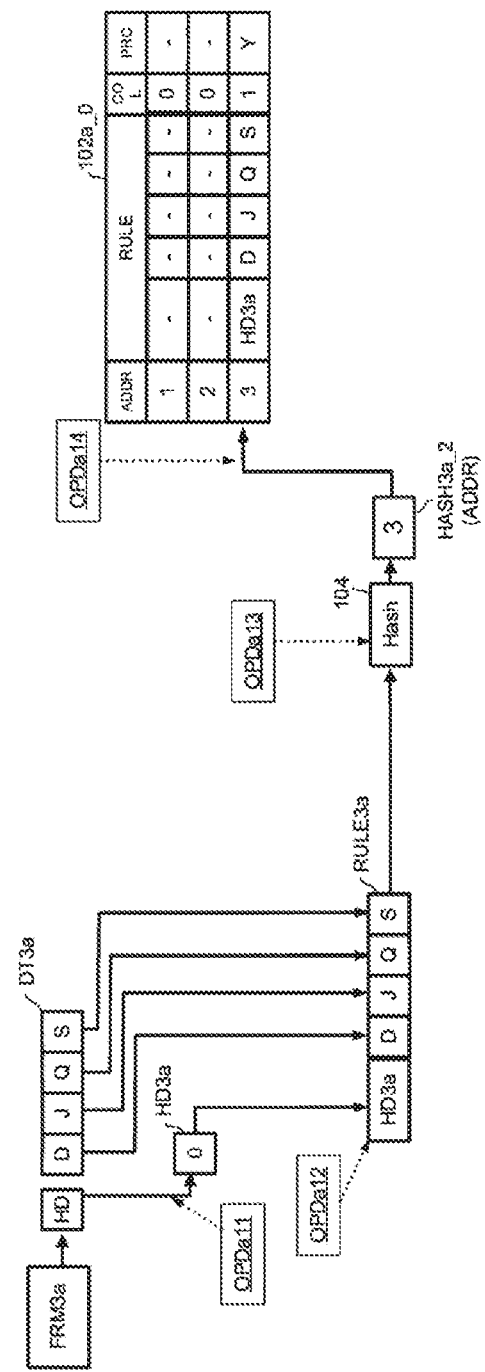
FIG. 10C is a diagram showing a third example of the definition part in the processing flow of the network switch according to the second embodiment.

FIGS. 10(a) to 10(c) show the processing flow of the network switch 505a on Embodiment 2 that belongs to the Defined Part. FIG. 10A illustrates an example in which the network switch 505a accepts a frame having a total data structure of 27 pieces of data FRM1a{HD, A, B, C, D, . . . , X, Y, Z} as a received frame. As described above, the received frame FRM1a includes frame headers HD.

First, in the processing OPDa01, the frame headers HD of the received frame FRM1a for which processing is to be accepted are analyzed. In the third embodiment, as a value that can be taken by the frame header HD, assumes three values 0, 1, 2 corresponding to the type of the network protocol received frame conforms. Here, HD1a=1 is obtained as the frame header value. Depending on the Frame Header Value HD1a being 1, the process proceeds to the next OPDa02.

Next, in the processing OPDa02, when defining the rule RULE1a corresponding to the received frame FRM1a, among the data structure of the frame, extracts the type of data structure of high importance regarding routing, and holds as the extracted data EDT1a. Here, the important type of data structure regarding routing is defined in advance by the designer or user of the communication system, for example, data describing information on the transfer destination of the frame. In FIG. 10(a), as a type of data of high importance regarding routing, the first, third, fourth, and 25th data configuration of the data comprising the reception frame FRM1a is extracted, the case of obtaining the extracted data EDT1a{A, C, D, Y} is described.

Next, in the process OPDa03, the entire data configuration of the received frame FRM1a{A, B, C, D, . . . , X, Y, Z} is input to the hash generator 104 to obtain the hash value HASH1a_1 of the first stage.

In the subsequent process OPDa04, the hash value HASH1a_1 of the first stage is held as the rule number RNUM1a. A rule number is also called a hash ID.

In the subsequent process OPDa05, the frame header HD1a, the rule number RNUM1a, and the extracted data EDT1a{A, C, D, Y} are concatenated to form a rule RULE1a.

Next, in the process OPDa06, the rule RULE1a is input to the hash generator 104 in the same manner as in the first embodiment to obtain the hash value HASH1a_2 of the second stage. Here, assume that the hash value HASH1a_2=2 of the second stage is obtained.

Then, in the subsequent process OPDa07, the position is stored in the address ADDR=2 in the rule table 102a_1 in the same manner as in the first embodiment. Similarly to the first embodiment, the collision bit COL and the process group information GRP are also set.

Next, referring to FIG. 10B, in the process OPDa08, the frame header HD is analyzed for the data structure of the received frame FRM2a{HD, A, B, C, D} having a smaller data width than the received frame FRM1a, and the frame header value HD2a=2 is obtained. Depending on the Frame Header Value HD2a being 2, the process proceeds to the next OPDa09.

In the subsequent process OPDa09, the header HD2a and the data structure {A, B, C, D} of the received frame FRM2a are concatenated to form a rule RULE2a.

In the subsequent process OPDa10, the rule RULE2a is stored at an optional address in the rule table 102a_2, here, at the position of the address ADDR=1. Similarly to the first embodiment, the collision bit COL and the process group information GRP are also set.

Next, referring to FIG. 10C, in the process OPDa11, the frame header HD is analyzed for the data structure of the received frame FRM3a{HD, D, J, Q, S} having a smaller data width than the received frame FRM1a, and the frame header value HD3a=0 is obtained. Depending on the Frame Header Value HD3a being 0, the process proceeds to the next OPDa12.

In the subsequent process OPDa12, the header HD3a and the data configuration DT3a{D, J, Q, S} are concatenated to form a rule RULE3a.

In the subsequent processing OPDa13, the data structure {D, J, Q, S} of the received frame FRM3a is input to the hash generator 104, and 3 is obtained as the hash value HASH3a_2 of the second stage. That is, in the process when the frame header value HD3a=0, the hash value of the first stage is not used.

Then, in the following OPDa14, the rule RULE3a is stored at the position of the address ADDR=3 in the rule table 102a_0 according to the method of the first embodiment. Similarly to the first embodiment, the collision bit COL and the process group information GRP are also set.

(Processing Flow of the Second Embodiment: Switch Operation Part)

Figure 11A:
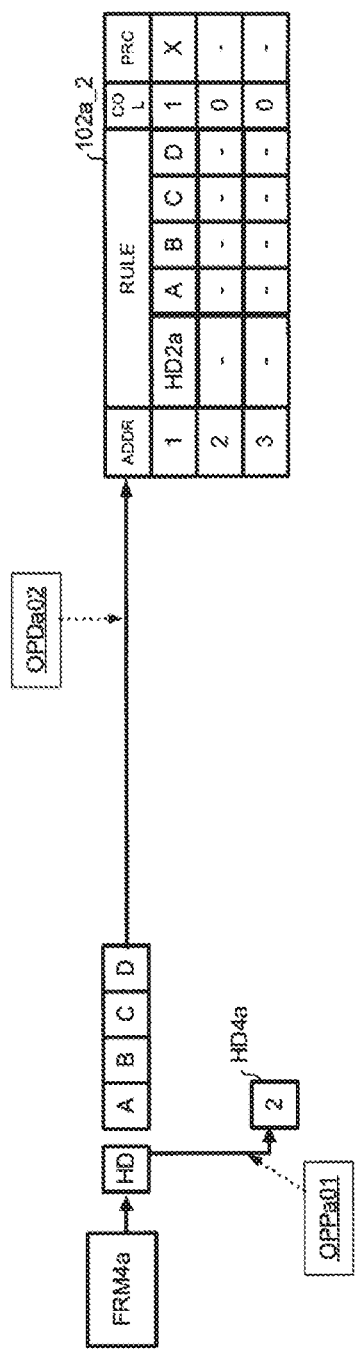
FIG. 11A is a diagram showing a first example of a switch operation part in the processing flow of the network switch according to the second embodiment.
Figure 11B:
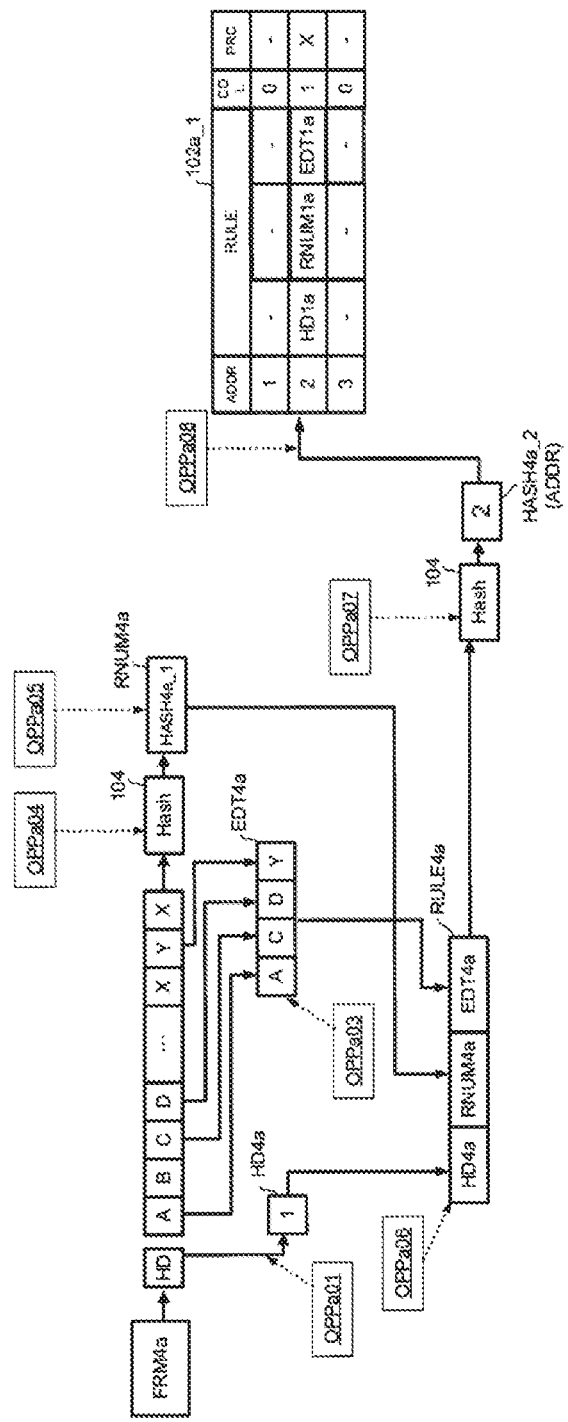
FIG. 11B is a diagram showing a second example of the switch operation part in the processing flow of the network switch according to the second embodiment.
Figure 11C:
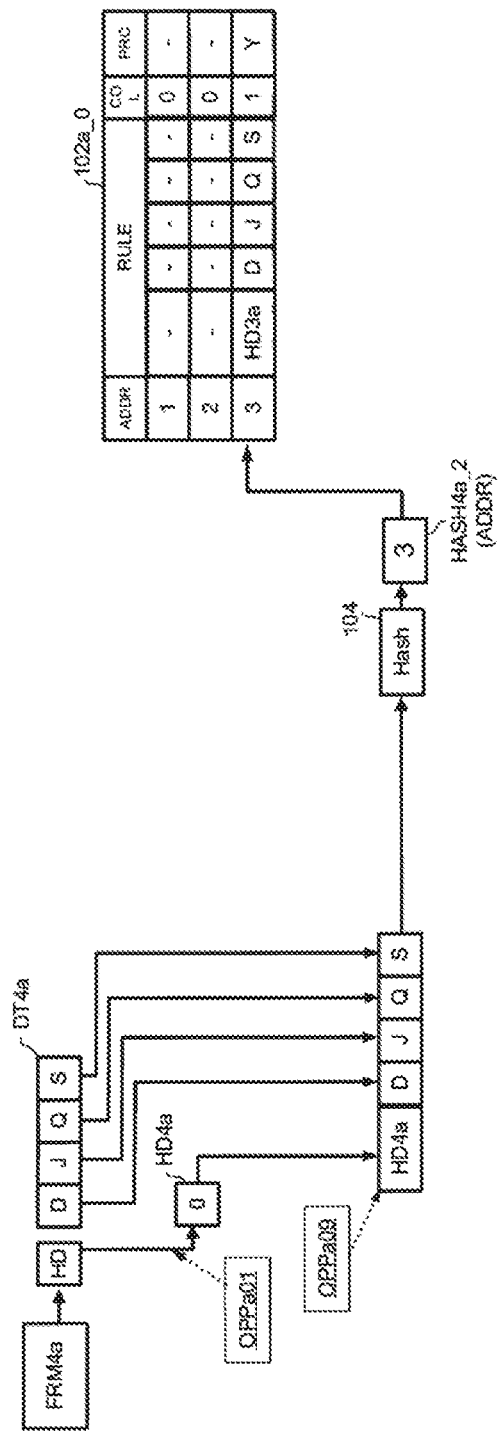
FIG. 11C is a diagram showing a third example of the switch operation part in the processing flow of the network switch according to the second embodiment.

FIGS. 11(a) to 11(c) shows the switch operation according to the second embodiment. One of the distinguishing features of the rule table 102a according to the second embodiment is that the rule table 102a has different rule tables 102a_0, 102a_1, and 102a_2 according to the frame header HD associated with the received frame FRMa, and the rule table to be referred to first is configured differently according to the frame header HD of the frame FRM. Specifically, it is configured to first refer to the rule table 102a_0 for the frame with the frame header HD=0, the rule table 102a_1 for the frame with the frame header HD=1, and the rule table 102a_2 for the frame with the frame header HD=2.

First, referring to FIG. 11(a), in the processing OPPa01, the frame header HD of the received frame FRM4a is analyzed to obtain the frame header value HD4a. If the frame header value HD4a is 2, the processing proceeds to the next processing OPPa02; if the frame header value HD4a is 1, the processing proceeds to the processing OPPa03; if the frame header value HD4a is 0, the processing proceeds to the processing OPPa09.

In the processing OPPa02, the rule table 102a_2 is searched based on the data configuration of the received frame FRM4a in the manner of the examination according to the first embodiment, and when there is a rule that matches the data configuration of the received frame FRM4a, the corresponding processing is executed.

In the processing OPPa03, similarly to the data extraction rule described in the processing OPDa02, the first, third, fourth, and 25th data configurations of the data constituting the received frame FRM4a are extracted, and extracted data EDT4a{A, C, D, Y} is obtained.

Next, in the process OPPa04, the entire data structure of the reception frame FRM4a to be accepted is input to the hash generator 104, and the hash value HASH4a_1 of the first stage is obtained.

In the subsequent process OPPa05, the hash value HASH4a_1 of the first stage is held as the rule number RNUM4a.

In the subsequent process OPPa06, the frame header HD4a, the rule number RNUM4a, and the extracted data EDT4a{A, C, D, Y} are concatenated to form a rule RULE4a.

In a subsequent process OPPa07, the rule RULE4a is input to the hash generator 104 in a manner similar to embodiment 1 to obtain a second stage hash value HASH4a_2.

Then, in the subsequent processing OPPa8, the rule table 102a_1 is searched by the method according to the first embodiment in the same manner as the first embodiment, and when there is a rule that matches the data configuration of the received frame FRM4a, the corresponding processing is executed.

In the processing OPPa09, the rule table 102a_0 is searched by the method according to the first embodiment based on the received frame FRM4a, and when there is a rule that matches the data structure of the received frame FRM4a, the corresponding processing is executed.

Effect of Embodiment 2

The main effect of the network switch 505a on embodiment 2 is as follows: That is, the rule RULE2a stored in the rule table 102b1 is composed of a hash HASH2a_1 of the first stage based on the data structure of the reception frame FRM1a and an extracted data EDT1a in which a high-importance type of data structure is extracted from the data structure of the frame FRM1a. In addition, the address at which the rule RULE2a is stored is determined by the hash HASH2a_2 of the second stage based on the rule RULE2a. According to this configuration, the data size of the rule table 102b_1 corresponding to a frame having a long data length (data width) can be reduced, and the network switch 505 can be configured with a small area and low power consumption.

Other Effects of Embodiment 2

The main effects of the network switch 505a on Embodiment 2 are as follows: That is, the network switch 505a according to the second embodiment has three rule tables 102a_0, 102a_1, and 102a_2 in the rule table 102a, and the rule table to be referred to first differs according to the frame header value HD4a of the frame FRM4a. The three rule tables 102a_0, 102a_1, and 102a2 have different search priorities, rule storage rules, and retrieval methods, and the network switch 505a applies the appropriate rule registering method and retrieval method with appropriate priorities according to the frame header value HD4a. As a result, the network switch 505a can optimize the order of rule search and processing in the communication system 1 by enabling the retrieval and processing of each rule to be executed in the order of priority while a plurality of rule definition methods are mixed.

Embodiment 3

Subsequently, the third embodiment will be described. In the third embodiment, a network switch 505b which is another form of the network switch 505 according to the first embodiment will be described. FIG. 12 is a diagram showing a configuration example of the rule table 102b included in the network switch 505b according to the third embodiment. Network switch 505b, other than the processing method of the rule table 102b and its internal data may be the same as in the first embodiment. The internal configuration, processing and operation steps of the network switch 505b, description relating to those with the same reference numerals as in the first embodiment, the description of the first embodiment is applied accordingly.

(Method for Constructing Collision Data According to the Third Embodiment)

In the first embodiment, it is determined that the rule RULE already exists at the position indicated by the address ADDR in the rule table 102 based on the collision bit COL that takes the state of either True (1) or False (0). The inventors have further found the following problems. That is, when a large number of rule RULE are stored in the rule table 102 and, for example, 90% or more of the rule table 102 is filled with rules, when a hash value conflict occurs, the number of address increments required for finding an address ADDR in which the rule RULE is not stored increases, and the time required for rule searching increases significantly. In the third embodiment, instead of the collision bit COL, the above-described problem is solved by providing the collision data CDATA to the rules in the rule table 102b. Details thereof will be described below. The following series of processing flows are implemented and controlled by the control circuit 109 included in the network switch 505b unless otherwise specified.

FIG. 12 shows a configuration example of the rule table 102b in the network switch 505b according to the third embodiment. The rule table 102b is remarkably different from the rule table 102 according to the first embodiment in that the collision bit COL is replaced with the collision data CDATA. The collision bit COL in the first embodiment takes the status of either True (1) or False (0) to indicate that the rule RULE already exists at the position indicated by the address ADDR in the rule table 102. On the other hand, the collision data CDATA according to the third embodiment stores a plurality of information useful for registering and retrieving rules. FIG. 12 illustrates an example in which the entry lid EV, the collision bit CB, the collision pointer valid CRPV, and the collision pointer CRP are defined as the information constituting the collision data CDATA.

The entry lid EV is set to 1 if the rule RULE exists in the corresponding address ADDR, and is set to 0 otherwise. The collision bit CB is set to 1 if the value of the corresponding address ADDR differs from the hash value HASH of the rule RULE stored in the address ADDR position, and to 0 otherwise. The collision state invalid CRPV is set to 1 if an attempt is made to override another rule RULE at the same address ADDR position, with the rule RULE already at the corresponding address ADDR location, and set to 0 otherwise. The collision pointer CRP stores the reassigned address ADDR in another rule RULE when an attempt is made to overwrite another rule RULE at the same address ADDR position with a rule RULE already present at the corresponding address ADDR location.

Figure 13A:
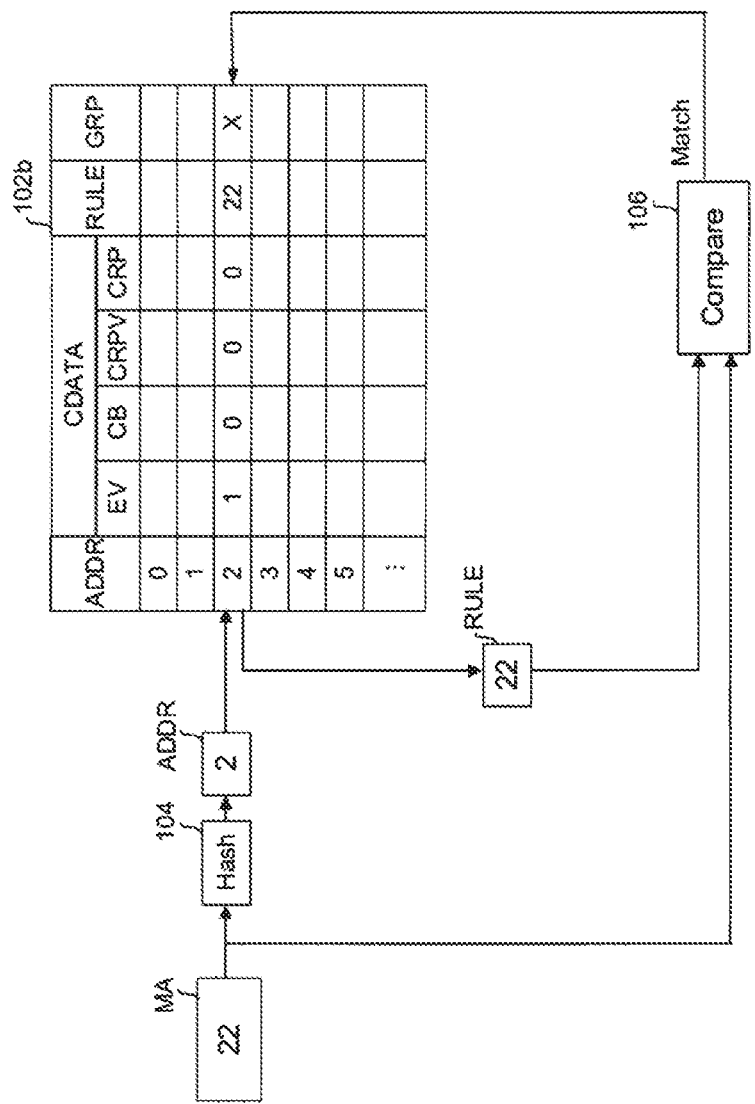
FIG. 13A is a diagram showing a first example of rule search processing in the network switch according to the third embodiment.

FIGS. 13(a) to 13 (b) show examples of the operation of the network switch 505 using the rule table 102b having the collision data CDATA described above. Here, in the third embodiment, assuming processing of the actual Ethernet frame, it is assumed that the MAC address MAC in Ethernet standard corresponds to the rule RULE. Further, instead of the MAC address, it may be configured to include the frame information defining the destination of the frame in the communication system 1 in the rule RULE.

(A Method for Retrieving a Rule According to the Third Embodiment)

FIG. 13(a) shows a first example of a process for retrieving whether or not a predetermined rule or MAC address is registered in the rule table 102b. Here, in order to assume a case in which the rule is configured to accept the MAC address MAC=22 as a reception frame, the frame FRM of the first embodiment is replaced with the MAC address MAC.

FIG. 13(a) illustrates a process in which, when data is written at the position of ADDR=2 and the position of ADDR=4 in the rule table 102b, the rule RULE corresponding to the MAC address MAC=22 is searched for where in the rule table 102b.

First, the MAC address MAC=22 is input to the hash generator 104 in the method of the first embodiment to obtain the hash value HASH=2. Next, based on HASH=2, the address ADDR=2 is set, and the rule RULE at the position of the address ADDR=2 in the rule table 102b is read. Then, it is determined that both the read rule RULE and the MAC address MAC match at 12, and the desired processing is executed by referring to the corresponding process group information GRP. Thus, the network switch 505 can perform a predetermined process PRC according to the rule RULE registered in response to a particular MAC address MAC.

Figure 13B:
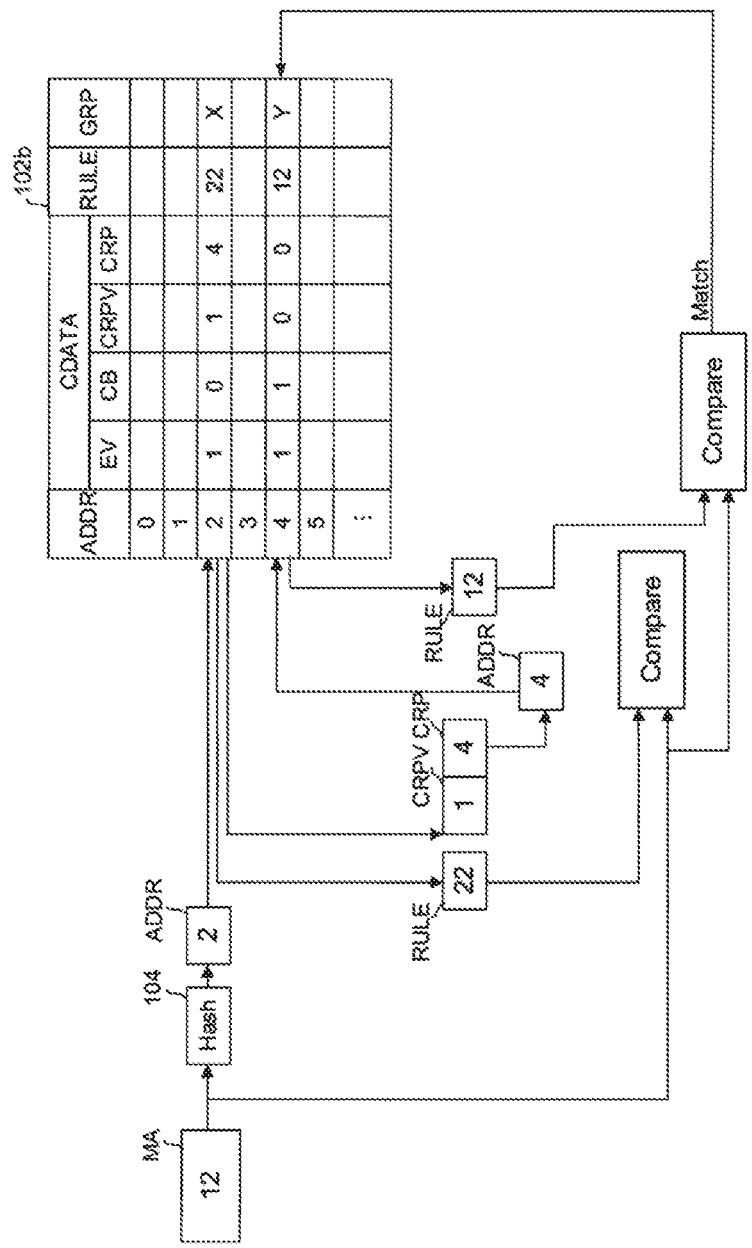
FIG. 13B is a diagram showing a second example of the rule search process in the network switch according to the third embodiment.

FIG. 13(b) shows a second example of a process of retrieving whether or not a predetermined MAC address MAC is registered in the rule table 102b as a rule RULE. Specifically, FIG. 13(b) illustrates a process for retrieving whether or not the rule RULE corresponding to the MAC address MAC=12 is registered in the rule table 102b.

First, the MAC address MAC=12 is input to the hash generator 104 in the method of the first embodiment to obtain the hash value HASH=2. That is, FIG. 13(b) illustrates a case in which a collision of hash values occurs in the MAC address MA=12 and the MA=22 with respect to FIG. 13(a). Next, based on HASH=2, the address ADDR=2 is set, and the rule RULE2b at the position of the address ADDR=2 in the rule table 102b is read.

Next, it is determined that the read rules RULE and the MAC address MA do not match, and CPRV=1 is obtained by referring to the collision pointer valid CRPV. If CPRV is 1, it is determined that there is another rule RULE which attempts to overwrite the corresponding address ADDR=2, and subsequently, the collision pointer CRP is referred to, and CRP=4 is obtained. Since the CRP is 4, it is determined that ADDR=4 was referenced as the write destination following the rule RULE attempting to overwrite ADDR=2 position, and then the rule RULE4b with ADDR=4 is read. Then, it is determined that both the read rules RULE4 and the MAC addresses MA coincide with each other at 22, and the corresponding process group information GRP is referred to execute a desired process PRC.

Figure 14A:
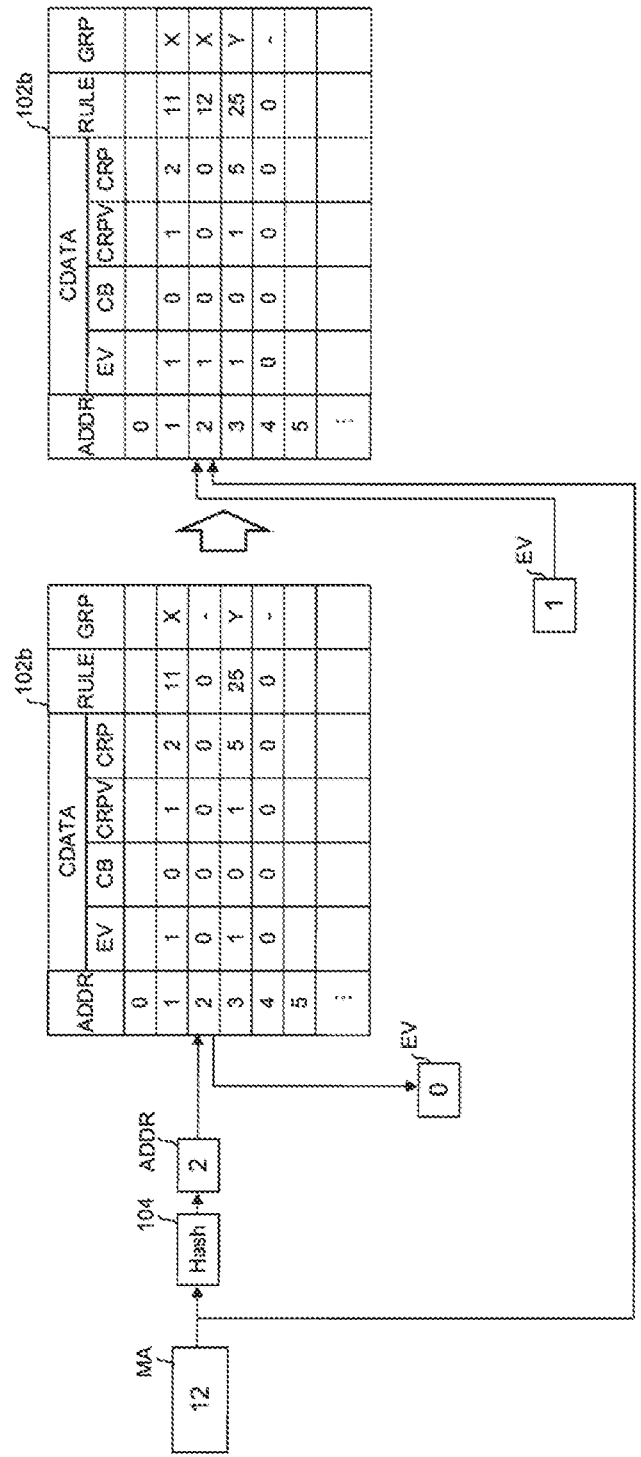
FIG. 14A is a diagram showing a first example of rule registration processing in the network switch according to the third embodiment.

FIG. 14A shows a first embodiment process of registering a predetermined MAC address MA in the rule table 102b as a rule RULE. Here, it is assumed that the MAC address MAC=12 is registered in the rule table 102b. First, the MAC address MAC=12 is input to the hash generator 104 in the method of the first embodiment to obtain the hash value HASH=2. Next, based on HASH=2, the address ADDR=2 is set, and the collision data CDATA at the position of the address ADDR=2 in the rule table 102b is read, and the EV=0 is obtained by referring to the entry valid EV included in the collision data CDATA. Because the entry valid EV is 0, it is determined that no rule RULE has been written yet at the corresponding address ADDR=2, and 12 is written as a rule RULE. At the same time, the entry lid EV is set to 1. As a result, a desired rule RULE can be registered in the rule table 102b.

Figure 14B:
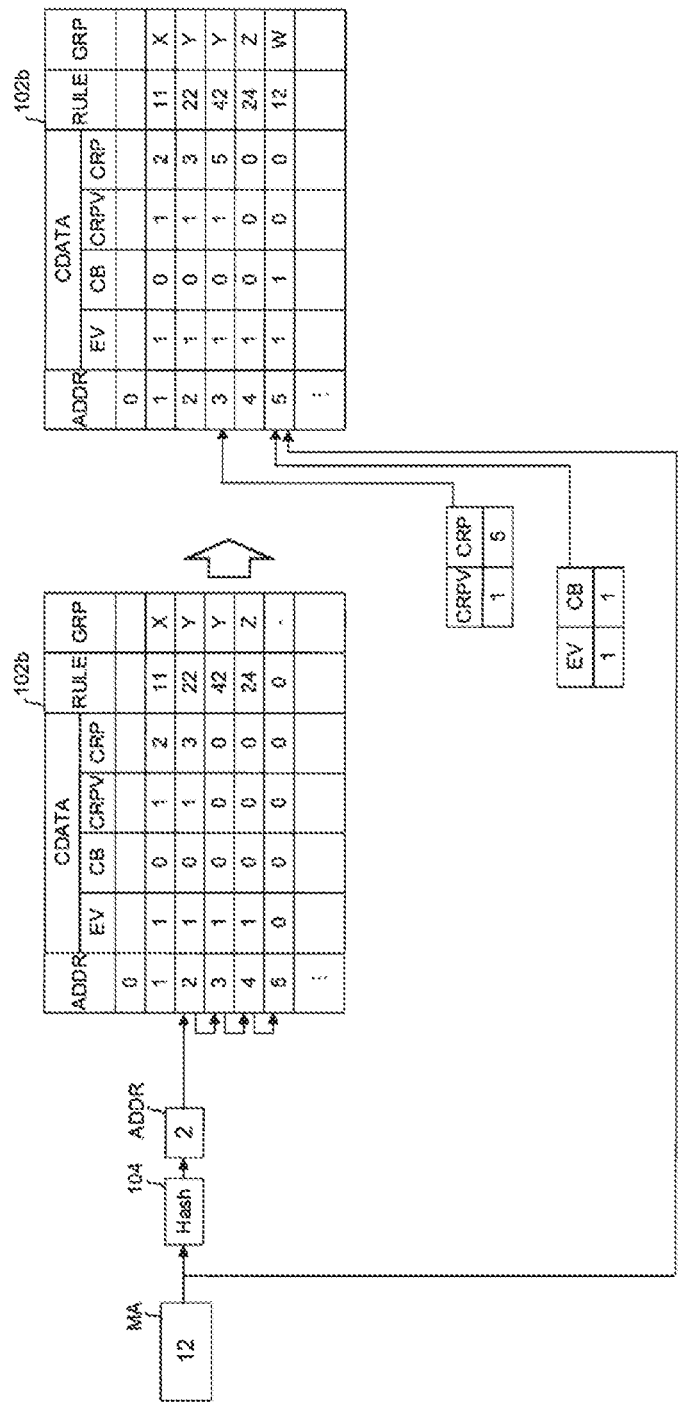
FIG. 14B is a diagram showing a second example of the rule registration process in the network switch according to the third embodiment.

FIG. 14(b) shows a second example of a process of registering a predetermined MAC address MAC as a rule RULE in the rule table 102b. Here, it is assumed that the MAC address MAC=12 is registered in the rule table 102b. Since the value of the data stored in the rule table 102b is different from that of the first example disclosed in FIG. 14(a), the processing to be applied is different. Details are described below.

First, the MAC address MAC=12 is input to the hash generator 104 in the method of the first embodiment to obtain the hash value HASH=2. Next, based on HASH=2, the address ADDR=2, and reads the collision data CDATA at the position of the address ADDR=2 in the rule table 102b. Then, EV=1 is obtained by referring to the entry lid EV included in the collision data CDATA. Since the entry bailed EV is 1, it is determined that a rule RULE has been written to the corresponding address ADDR=2.

In this case, CB=0 is obtained by referring to the collision bit CB. Since the collision bit CB is 0, it is determined that the address ADDR is the same 2 as the hash value RULE for the rule HASH stored in the address ADDR=2. That is, it is determined that the rule ADDR stored in the address=2 position is written to the address RULE position directly corresponding to the hash value HASH without passing through the process of avoiding the hash conflict.

Next, the rule RULE=22 stored in the address ADDR=2 position is compared with the MAC address MAC=12 to be registered, and it is determined that there is a mismatch. Based on this discrepancy determination, the collision pointer valid CRPV is then referenced to obtain CPRV=1. Since the collision pointer valid CRPV is 1, CPR=3 is obtained by referring to the collision pointer CRP in order to determine ADDR of addresses to be referred to next. Since the collision pointer CRP is 3, the next addressing ADDR to be referred to is 3.

Next, the collision data CDATA at the position of the address ADDR=3 in the rule table 102b is read. Then, EV=1 is obtained by referring to the entry lid EV included in the collision data CDATA. Since the entry bailed EV is 1, it is determined that a rule RULE has been written to the corresponding address ADDR=3.

Next, the rule RULE=42 stored in the address ADDR=3 position is compared with the MAC address MAC=12 to be registered, and it is determined that there is a mismatch. Based on this discrepancy determination, the collision pointer valid CRPV is then referenced to obtain CPRV=0. Since the collision pointer invalid CRPV is 0, 1 is added (incremented) to the referenced address ADDR to determine the address ADDR to be referenced next. This results in an addressing ADDR of 4.

Next, the collision data CDATA at the position of the address ADDR=4 in the rule table 102b is read. Then, EV=1 is obtained by referring to the entry lid EV included in the collision data CDATA. Since the entry bailed EV is 1, it is determined that a rule RULE has been written to the corresponding address ADDR=4.

Next, the rule RULE=24 stored in the address ADDR=4 position is compared with the MAC address MAC=12 to be registered, and it is determined that there is a mismatch. Based on this discrepancy determination, the collision pointer valid CRPV is then referenced to obtain CPRV=0. Since the collision pointer invalid CRPV is 0, 1 is added (incremented) to the referenced address ADDR to determine the address ADDR to be referenced next. This results in an addressing ADDR of 5.

Next, the collision data CDATA at the position of the address ADDR=5 in the rule table 102b is read. Then, EV=0 is obtained by referring to the entry lid EV included in the collision data CDATA. Because the entry valid EV is 0, it is determined that no rule RULE has been written yet at the corresponding address ADDR=5, and a new rule RULE=12 is written. At the same time, the entry lid EV and the collision bit CB are set to 1. In addition, the collision pointer CRP is set to 5 based on RULE=5, which is the address at which the rule=12 is written, for ADDR=3, which is the address when the first collision pointer valid CRPV is detected to be 0 after starting the process for registering the rule RULE=12 in the rule table 102b. At the same time, the collision pointer valid CRPV is set to 1. Thus, when the MAC address MAC=12 is searched, the number of times of resetting the address ADDR can be omitted, and the switching operation can be accelerated.

Figure 14C:
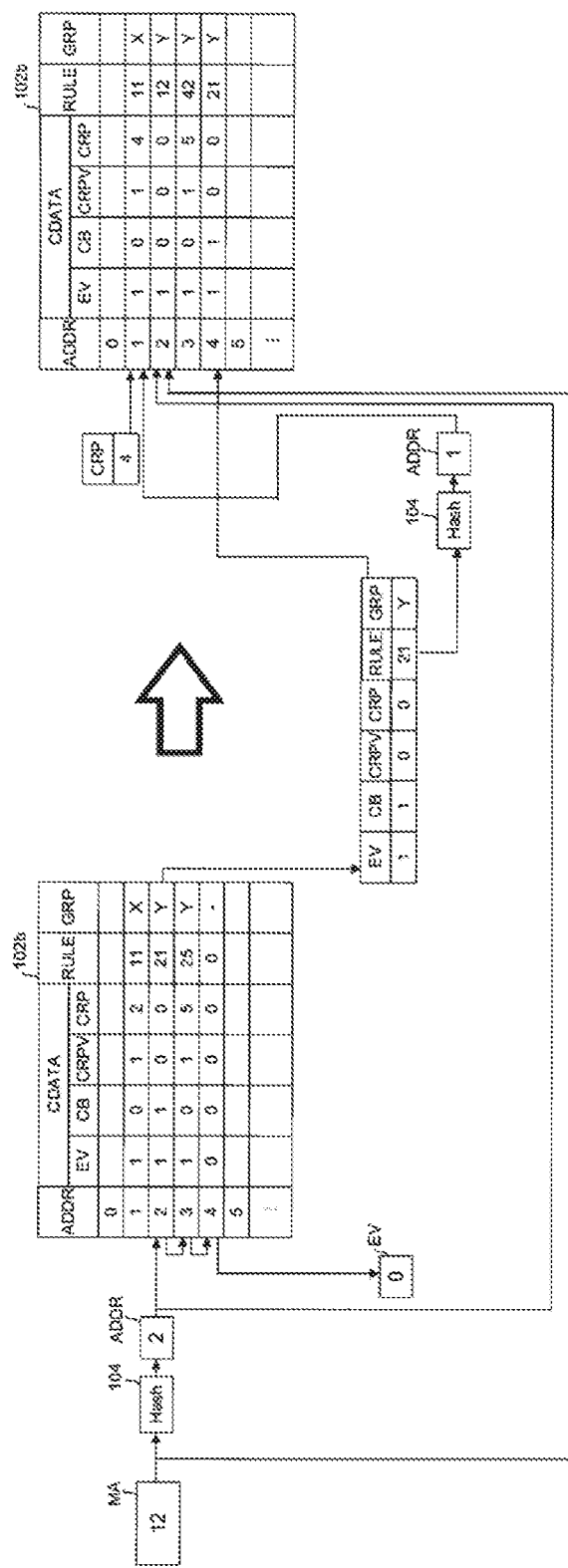
FIG. 14C is a diagram showing a third example of the rule registration process in the network switch according to the third embodiment.

FIG. 14(c) shows a third example of a process of registering a predetermined MAC address MAC as a rule RULE in the rule table 102b. Here, it is assumed that the MAC address MAC=12 is registered in the rule table 102b. Since the values of the data stored in the rule table 102b are different from those in the first example disclosed in FIG. 14(a) and the second example disclosed in FIG. 14(b), the processing to be applied is different. Details are described below.

First, the MAC address MAC=12 is input to the hash generator 104 in the method of the first embodiment to obtain the hash value HASH=2. Next, based on HASH=2, the address ADDR=2, and reads the collision data CDATA at the position of the address ADDR=2 in the rule table 102b. Then, EV=1 is obtained by referring to the entry lid EV included in the collision data CDATA. Since the entry bailed EV is 1, it is determined that a rule RULE has been written to the corresponding address ADDR=2.

Next, the collision bit CB is referred to obtain CB=1. Then, since the collision bit CB is 1, it is determined that the address ADDR does not match the hash value RULE stored in the address ADDR=2 position with the hash value HASH. That is, it is determined that the rule ADDR stored in the address ADDR=2 position is written to the address RULE position that does not correspond to the hash value HASH through the process of avoiding the hash collision.

Next, in the same process as described in FIG. 14(b), the collision data CRPV and the collision pointer CRP are referenced to sequentially read the collision data CDATA while changing the address ADDR, and the EV=0 is obtained by referring to the entry-validated EV at the address ADDR=4. Because the entry-valid-EV is 0, it is determined that no rule RULE has been written to the corresponding address ADDR=4.

In this case, that is, when the collision bit CB at the position of the first referenced address ADDR=2 is 1 and the address ADDR is updated and it is determined that the entry valid EV is 0 in the address ADDR=4, the data stored in the position of the first referenced address ADDR=2 is stored in the position of the address ADDR=4. Further, a rule RULE=21 is entered into the hash generator 104 to obtain a hash value HASH=1. Subsequently, the hash value HASH=1 is set to the address ADDR, and the address ADDR=4 is stored in the collision pointer CRP at the position where ADDR=1 when it is determined that the entry verid EV is 0. At the same time, 1 is stored in the collision pointer valid CRPV. Further, the address ADDR is set to 2 based on the hash value HASH=2 corresponding to the MAC address MAC=12 to be registered as a rule, and 12 is stored in the rule RULE at the address ADDR=2. As a result, when the MAC address MA=12 is searched, the rule RULE=12 is stored in the position of the address ADDR=2 which is in the vicinity of the address ADDR=1 referred to first, so that the address ADDR can be omitted from being reset and the switching operation can be speeded up.

Figure 15A:
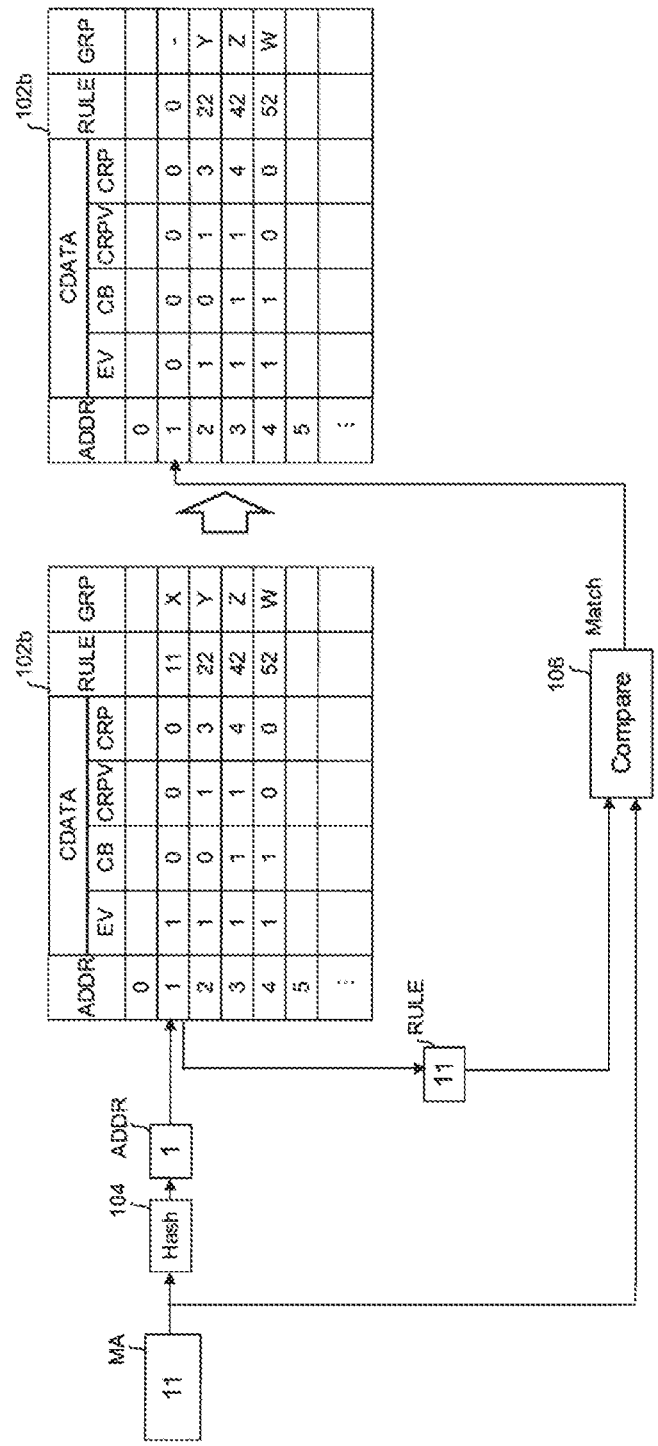
FIG. 15A is a diagram showing a first example of rule deletion processing in the network switch according to the third embodiment.

FIG. 15A shows a first exemplary process of deleting a predetermined rule RULE from the rule table 102b. Here, assume that the rule RULE=11 is deleted from the rule table 102b. First, the rule RULE=11 to be deleted is input to the hash generator 104, and the hash value HASH=1 is obtained. Next, the address ADDR is set to 1 based on the hash HASH=1, and the data at the position of the address ADDR=1 in the rule table 102b, specifically, the collision data CDATA and the rule RULE are read. When the collision position invalid CRPV is 0 and it is determined that both the read rule RULE and the rule RULE to be deleted coincide with each other at 11, the data stored in the address ADDR=1, specifically, the collision data CDATA, the rule RULE, and the process group information GRP are cleared. FIG. 15(a) shows an example of clearing the data by setting all the data at the position of the address ADDR=1 to 0. As a result, it is possible to delete the desired rule RULE and the data corresponding thereto from the rule table 102b.

Figure 15B:
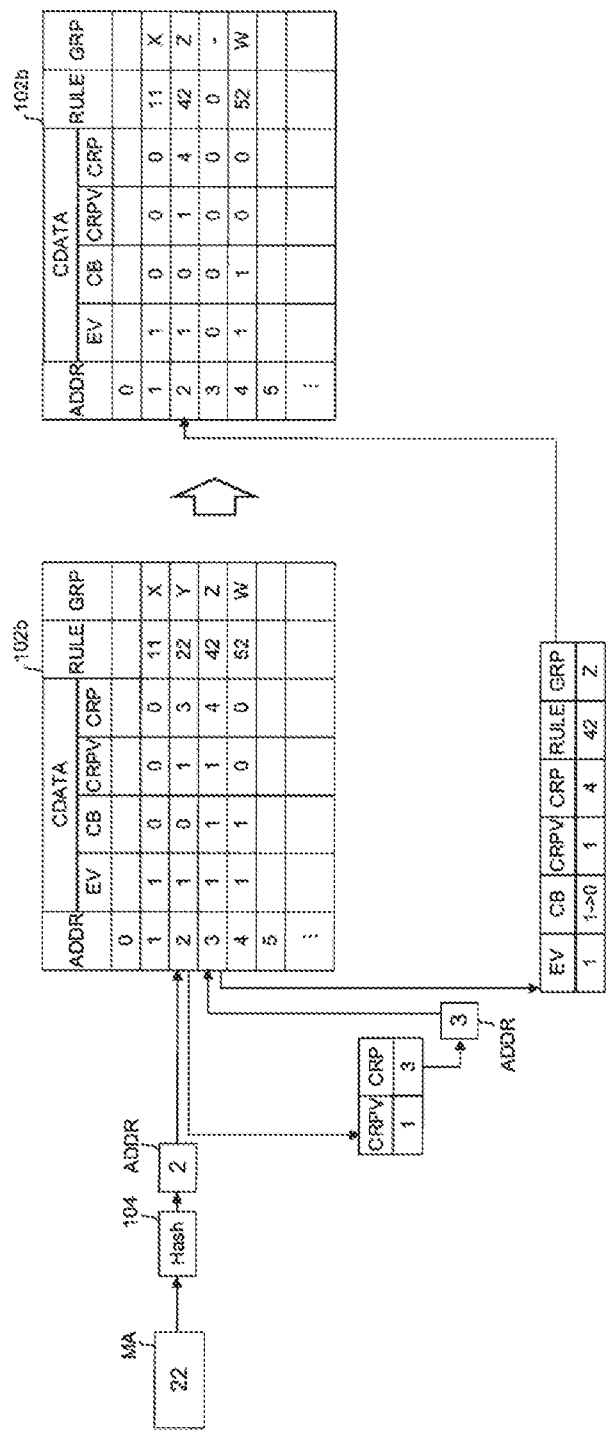
FIG. 15B is a diagram showing a second example of the rule deletion processing in the network switch according to the third embodiment.

FIG. 15B shows a second exemplary process of deleting a predetermined rule RULE from the rule table 102b. Here, assume that the rule RULE=22 is deleted from the rule table 102b. First, the rule RULE=22 to be deleted is input to the hash generator 104, and the hash value HASH=2 is obtained. Next, the address ADDR is set to 2 based on the hash value HASH=2, and the data at the position of the address ADDR=2 in the rule table 102b, specifically, the collision data CDATA and the rule RULE are read. Then, in response to determining that the collision pointer valid CRPV is 1 and that both the read rule RULE and the rule RULE to be deleted coincide at 22, the collision pointer CRP is referred to, and 3 is obtained as the collision pointer CRP. Based on the collision pointer CRP=3, the address ADDR=1 in which the rule RULE=22 is stored is overwritten with the data stored in the address ADDR=3, specifically, the collision data CDATA, the rule RULE, and the process group information GRP. Then, all the data stored in the address ADDR=3 is cleared to 0. Thus, while deleting the desired rule RULE and the corresponding data from the rule table 102b, the data in the rule table 102b can be aligned in response to the elimination of the hash conflict, the number of times of resetting the address ADDR can be reduced, and the switching operation can be accelerated.

Figure 15C:
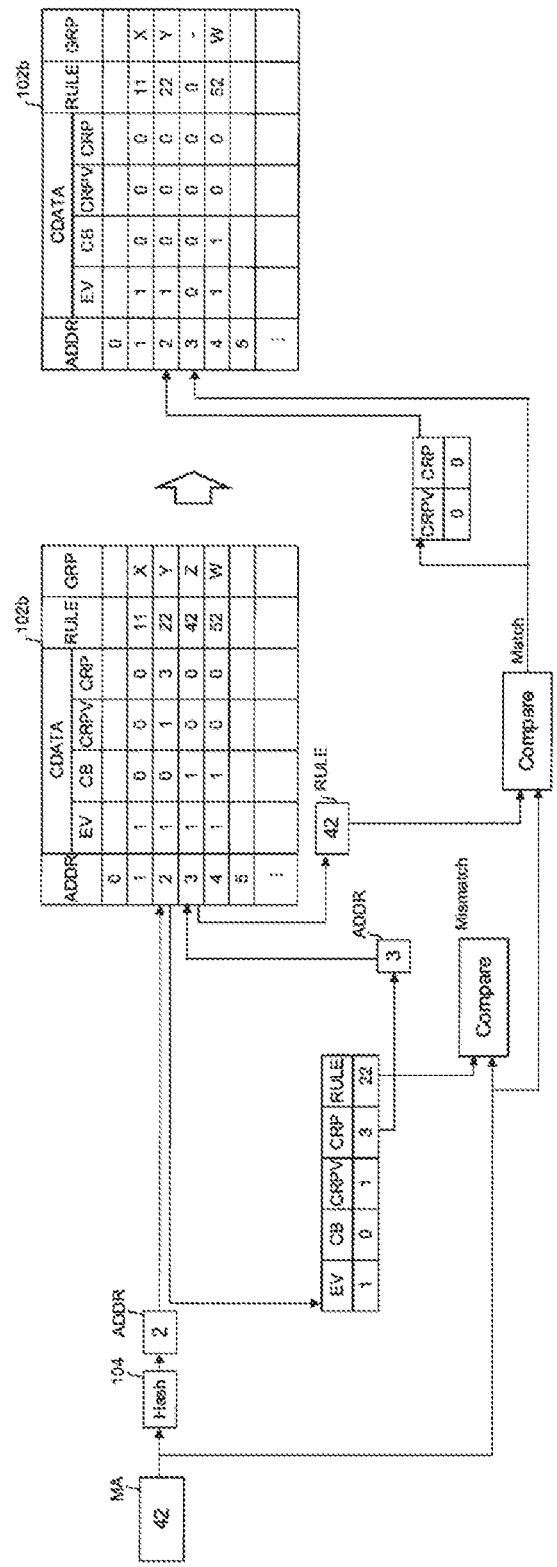
FIG. 15C is a diagram showing a third example of the rule deletion processing in the network switch according to the third embodiment.

FIG. 15C shows a third exemplary process of deleting a predetermined rule RULE from the rule table 102b. Here, assume that the rule RULE=42 is deleted from the rule table 102b. First, the rule RULE=42 to be deleted is input to the hash generator 104, and the hash value HASH=2 is obtained. That is, it is conflicting with the hash at RULE=22. Next, the address ADDR is set to 2 based on the hash value HASH=2, and the data at the position of the address ADDR=2 in the rule table 102b, specifically, the collision data CDATA and the rule RULE are read. Then, it is determined that the collision pointer valid CRPV is 1 and that the read rule RULE and the rule RULE to be deleted do not coincide with each other at 22 and 42, respectively. In response to this determination, the collision pointer CRP is subsequently referred to, and 3 is obtained as the collision pointer CRP. Based on the collision pointer CRP=3, the data stored in the address ADDR=3, specifically, the collision data CDATA and the rule RULE are read. Then, in response to determining that both the read rule RULE and the rule RULE to be deleted coincide with each other at 22, the data stored in the address ADDR=3, specifically, the collision data CDATA, the rule RULE, and the process group information GRP are cleared. Then, the collision pointer valid CRPV and the collision pointer CRP at the first referenced address ADDR=2 are cleared by writing 0 to each. Thus, at the same time as deleting the desired rule RULE and the corresponding data from the rule table 102b, the reference information to the rule RULE that has been deleted and has become undefined can also be deleted.

Figure 15D:
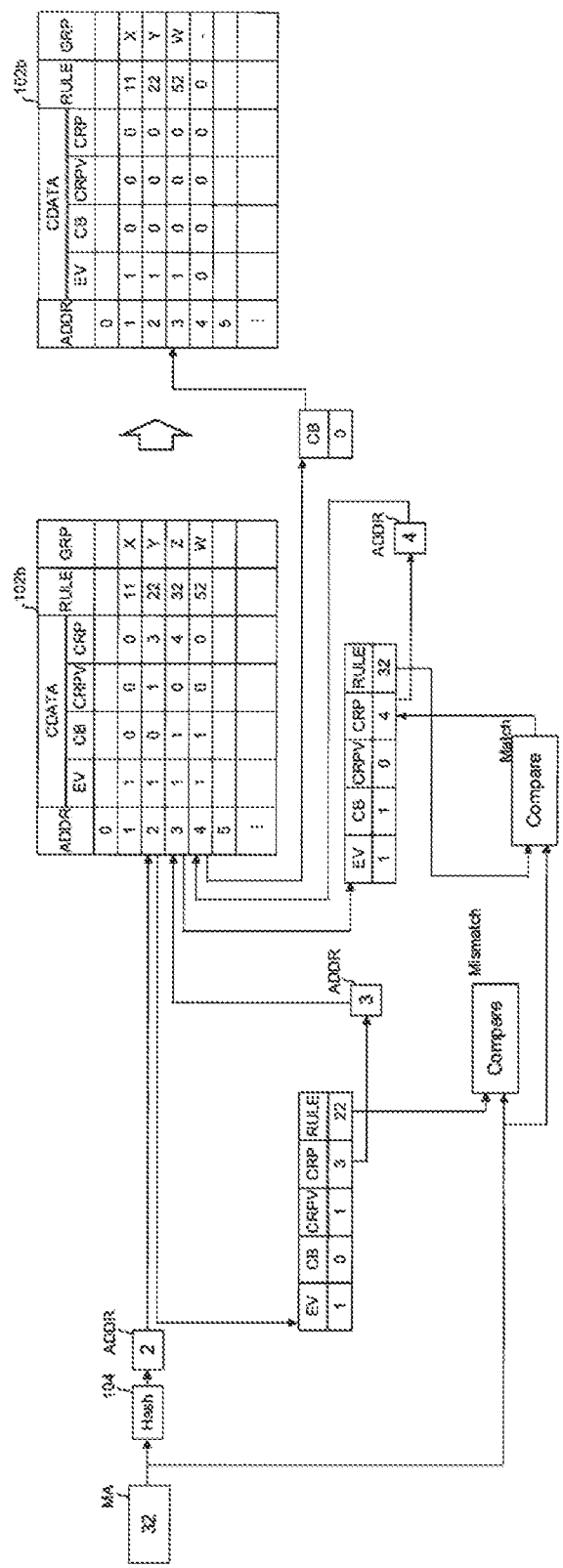
FIG. 15D is a diagram showing a fourth example of the rule deletion processing in the network switch according to the third embodiment.

FIG. 15D shows a fourth exemplary process of deleting a predetermined rule RULE from the rule table 102b. Here, assume that the rule RULE=32 is deleted from the rule table 102b. First, the rule RULE=32 to be deleted is input to the hash generator 104, and the hash value HASH=2 is obtained. That is, FIG. 15(d) shows cases where collisions with hash values occur when RULE is 22 or RULE is 42. Next, the address ADDR is set to 2 based on the hash value HASH=2, and the data at the position of the address ADDR=2 in the rule table 102b, specifically, the collision data CDATA and the rule RULE are read. Then, it is determined that the collision pointer valid CRPV is 1 and that the read rule RULE and the rule RULE to be deleted do not coincide with each other at 22 and 32, respectively. In response to this determination, the collision pointer CRP is subsequently referred to, and 3 is obtained as the collision pointer CRP. Based on the collision pointer CRP=3, the data stored in the address ADDR=3, specifically, the collision data CDATA and the rule RULE are read. The read rule RULE and the rule RULE to be deleted coincide with each other at 32. In response to this determination, the collision pointer CRP is referred to, and CRP=4 is obtained. Next, the address ADDR is set to 4 based on the collision pointer CRP=4, and all data at the address ADDR=4 is copied to the address ADDR=3 position. Here, the collision bit CB is forcibly cleared to 0. Finally, all the data stored in the address ADDR=4 is cleared and set to 0. Thus, while deleting the desired rule RULE and the corresponding data from the rule table 102b, the data in the rule table 102b can be aligned so that another rule RULE in which the hash value conflicts with the rule RULE that has been deleted and undefined can be retrieved without resetting the address ADDR, thereby speeding up the switching operation.

The main effects of the network switch 505b according to the third embodiment are as follows. That is, the rule table 102b includes a collision data CDATA to provide a means for appropriately resetting the presence or absence of a collision of hash value HASH or the address ADDR when a collision of hash value HASH occurs. This reduces the number of re-sets of address ADDR and speeds up the retrieval of rule RULE.

Another effect of the network switch 505b according to the third embodiment is as follows. That is, when creating or deleting a rule RULE, the data in the collision data CDATA is changed in response to the creation or deletion of the rule RULE. As a result, it is possible to reduce the frequency of occurrences of the collisions of the hash-value HASH and to speed up the search of the rules RULE.

(A variant of address handling for collision) Also, incrementing the address ADDR can be replaced by other methods. Examples include using a random number instead of 1 as the increment value, applying an arithmetic operation with an arbitrary number, making it possible to specify an arbitrary value by register setting or the like, selecting from a plurality of values according to the calculated value of the hash or the occurrence state of the collision, and combining them as appropriate.

Although the invention made by the inventor has been specifically described based on the embodiment, the present invention is not limited to the embodiment already described, and it is needless to say that various modifications can be made without departing from the gist thereof. In addition, in the description of the processing and the operation flow of each embodiment, it is assumed that the same processing and the operation flow as those already described are included even when it is obvious from the description and drawings that the same processing and the operation flow is repeatedly applied, even if the description is not given with a special symbol.

What is claimed is:

1. A network processing apparatus that receives a frame and executes a process defined corresponding to data included in the frame, the network processing apparatus comprising:
   a rule table configured to store configuration information of the data included in the frame as a rule; and
   a hash generator configured to input the rule and output a hash value corresponding to the rule,
   wherein the rule table is configured to store the rule corresponding to each of a plurality of addresses,
   wherein the network processing apparatus determines the address where the rule is stored, and
   wherein a value of the address comprises an entirety of the hash value.

2. The network processing apparatus according to claim 1, wherein the rule table includes a collision bit corresponding to each of a plurality of addresses, the collision bit indicating whether or not the rule is registered.

3. The network processing apparatus according to claim 1, wherein the network processing apparatus is configured to:
   (a) read the rule stored in the address determined based on the hash value;
   (b) compare the rule with the frame;
   (c) execute the defined process when the rule matches; and
   (d) update the address to a predetermined value and read again the rule when the rule does not match.

4. The network processing apparatus according to claim 3, wherein the predetermined value is obtained by incrementing the current address.

5. The network processing apparatus according to claim 3, wherein the predetermined value is obtained by arithmetic operation between the address and the predetermined value.

6. The network processing apparatus according to claim 3, wherein the rule table is configured to store a collision pointer indicating a reference destination address corresponding to each of the plurality of addresses, and
   wherein the predetermined value is a value of the collision pointer stored corresponding to the address.

7. The network processing apparatus according to claim 1, wherein the frame and the rule comprise MAC addresses.

8. The network processing apparatus according to claim 1, wherein the frame and the rule comprise frame information defining a transmission destination of the frame.

9. A network processing method comprising:
   (a) defining configuration information of a first frame as a first rule;
   (b) obtaining a first hash value based on the first rule;
   (c) obtaining a first address a value of which comprises an entirety of the first hash value;
   (d) registering the first rule at a location indicated by the first address on a rule table;
   (e) defining configuration information of a second frame as a second rule;
   (f) obtaining a second hash value based on the second rule;
   (g) obtaining a second address a value of which comprises an entirety of the second hash value;
   (h) determining whether a rule has already been registered at a location indicated by the second address on the rule table;
   (i1) updating the second address and executing the determining of (h) again when the rule is already registered at the determining of (h);
   (i2) registering the second rule at a position indicated by the second address on the rule table when the rule is not registered at the determining of (h);
   (j) receiving a third frame from external;
   (k) defining a third rule based on configuration information of the third frame;
   (l) obtaining a third hash value based on the third rule;
   (m) obtaining a third address a value of which comprises an entirety of the third hash value;
   (n) determining whether the rule is already been registered at a position indicated by the third address on the rule table;
   (o1) reading the registered rule as a fourth rule and determining whether the registered rule matches the third frame when the rule is already registered at the determining of (n);
   (o2) executing a process corresponding to the third rule when the determining of (o1); and
   (o3) updating the third address and executing again determining of (n) when there is no match at the determining of (o1).

10. The network processing method according to claim 9, wherein the updating of (i1) comprises incrementing the second address.

11. The network processing method according to claim 9, wherein the updating of (i1) comprises performing an arithmetic operation between the second address and a predetermined value.

12. The network processing method according to claim 9, wherein the updating of (o3) comprises incrementing the third address.

13. The network processing method according to claim 9, wherein the updating of (o3) comprises performing an arithmetic operation between the third address and a predetermined value.

14. The network processing method according to claim 9,
   wherein the rule table is configured to store a collision pointer indicating a reference destination address at a position indicated by an arbitrary address, and
   wherein the updating of (o3) comprises setting the updated third address to the collision pointer stored in the position indicated by the third address.

15. The network processing method according to claim 9, wherein each of the first frame, the second frame, the third frame, the first rule, the second rule, and the third rule includes a MAC address.

* * * * *